(12) United States Patent
Yamashita et al.

(10) Patent No.: US 8,948,469 B2
(45) Date of Patent: Feb. 3, 2015

(54) INFORMATION PROCESSING DEVICE, INFORMATION PROCESSING METHOD, AND PROGRAM

(75) Inventors: Junichi Yamashita, Saitama (JP); Naoyuki Onoe, Kanagawa (JP)

(73) Assignee: Sony Corporation (JP)

( * ) Notice: Subject to any disclaimer, the term of this patent is extended or adjusted under 35 U.S.C. 154(b) by 361 days.

(21) Appl. No.: 13/459,795

(22) Filed: Apr. 30, 2012

(65) Prior Publication Data

US 2012/0301860 A1 Nov. 29, 2012

(30) Foreign Application Priority Data

May 23, 2011 (JP) ................ 2011-114378

(51) Int. Cl.
*G06K 9/00* (2006.01)
*G09B 5/00* (2006.01)
*G09B 7/00* (2006.01)
*G06K 9/46* (2006.01)
*G06K 9/62* (2006.01)

(52) U.S. Cl.
CPC .. *G09B 5/00* (2013.01); *G09B 7/00* (2013.01); *G06K 9/00228* (2013.01); *G06K 9/4661* (2013.01); *G06K 9/6257* (2013.01)
USPC ........................................ 382/118

(58) Field of Classification Search
None
See application file for complete search history.

(56) References Cited

U.S. PATENT DOCUMENTS

| 2005/0102246 | A1* | 5/2005 | Movellan et al. ........... 706/12 |
| 2005/0280809 | A1* | 12/2005 | Hidai et al. ............. 356/237.3 |
| 2009/0175533 | A1* | 7/2009 | Sabe et al. ................ 382/159 |
| 2011/0299783 | A1* | 12/2011 | Chotard et al. ........... 382/195 |

FOREIGN PATENT DOCUMENTS

JP 4517633 5/2010

* cited by examiner

*Primary Examiner* — Stephen R Koziol
*Assistant Examiner* — Delomia Gilliard
(74) *Attorney, Agent, or Firm* — Lerner, David, Littenberg, Krumholz & Mentlik, LLP

(57) ABSTRACT

A correction unit corrects parameters of an ensemble learner having a plurality of weak learners that receive characteristic amounts extracted from an input image and output weak hypotheses indicating whether or not a predetermined target is reflected in the input image using correction information. A discrimination processing unit integrates the weak hypotheses output from the weak learners with respect to the characteristic amounts using the ensemble learner of which the parameters are corrected and discriminates whether or not the target is reflected in the input image based on an integrated value of the weak hypotheses. The correction information is calculated based on a light source illuminating the target in a correction information calculation unit 54. The present technology may be applied, for example, to a case of discriminating whether or not the target is reflected in the input image, and so forth.

9 Claims, 26 Drawing Sheets

LEARNING DEVICE

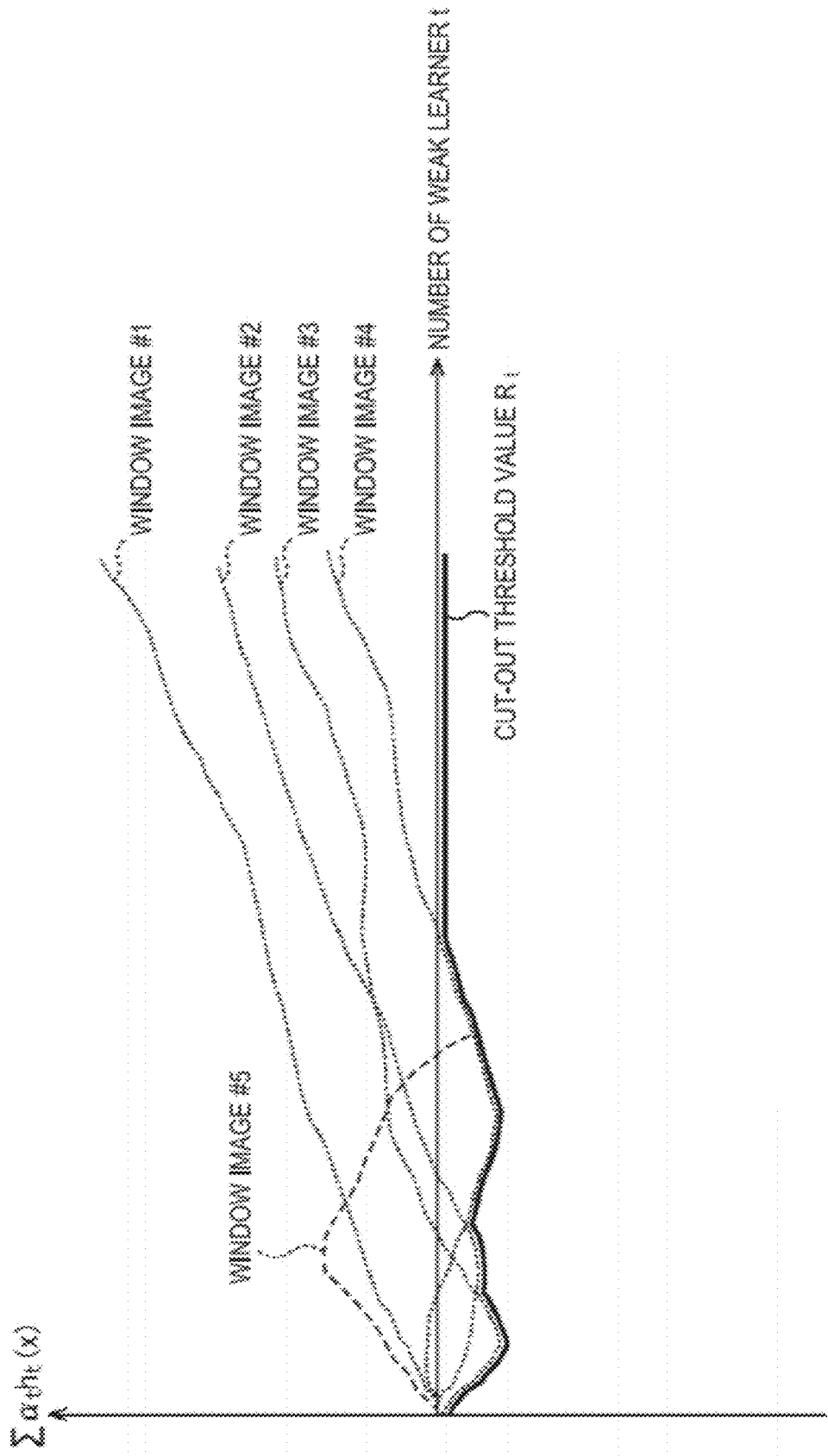

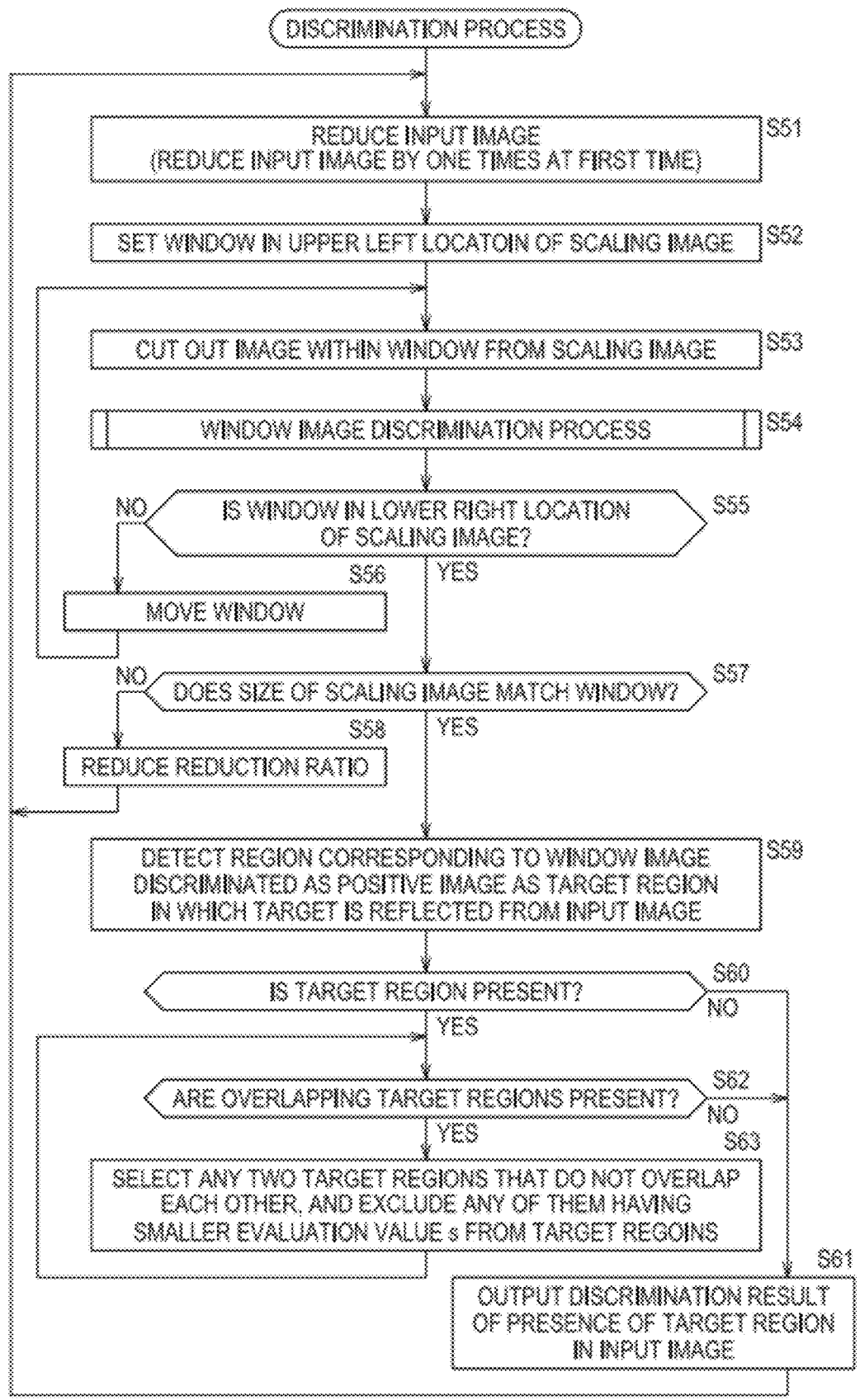

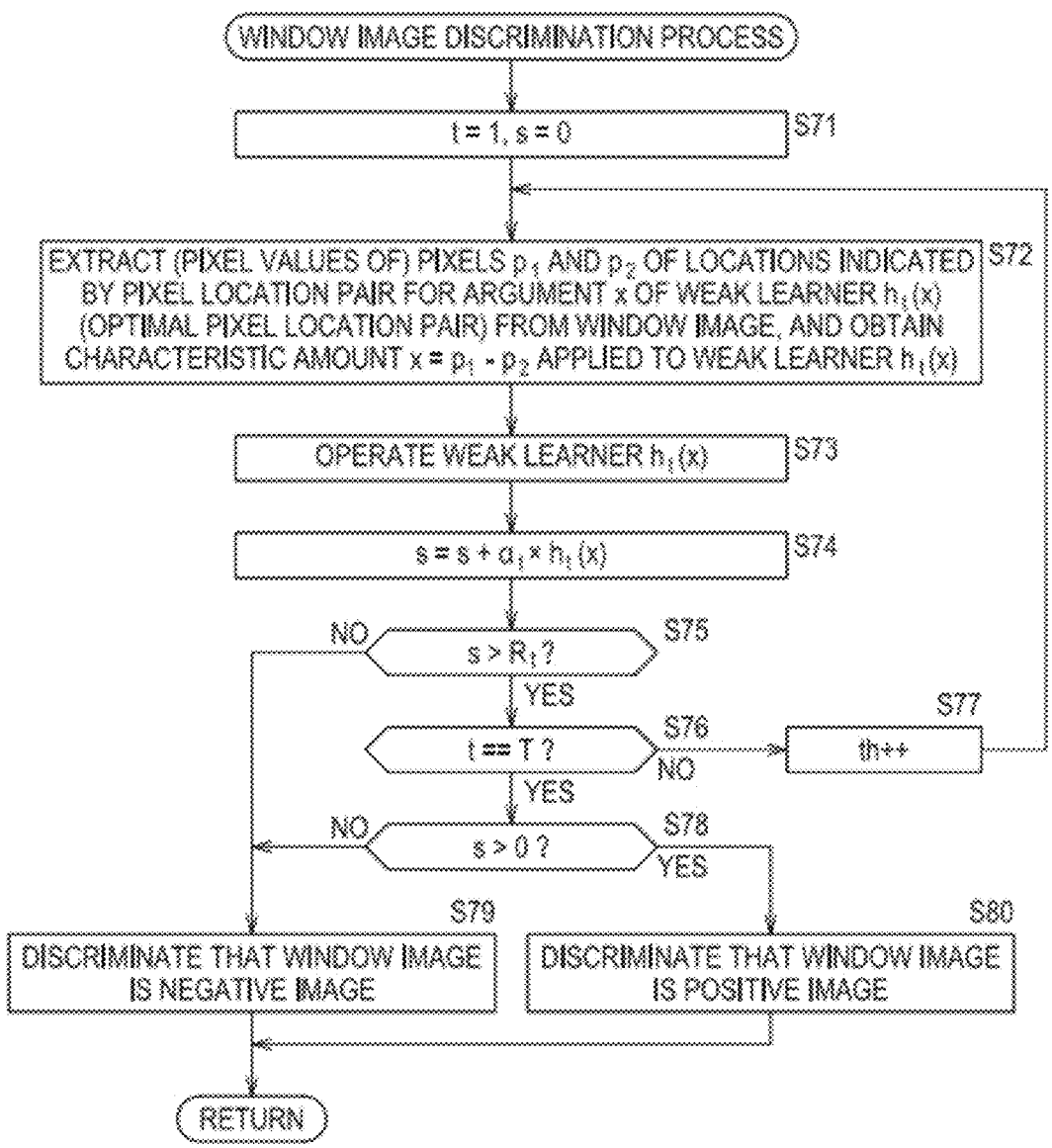

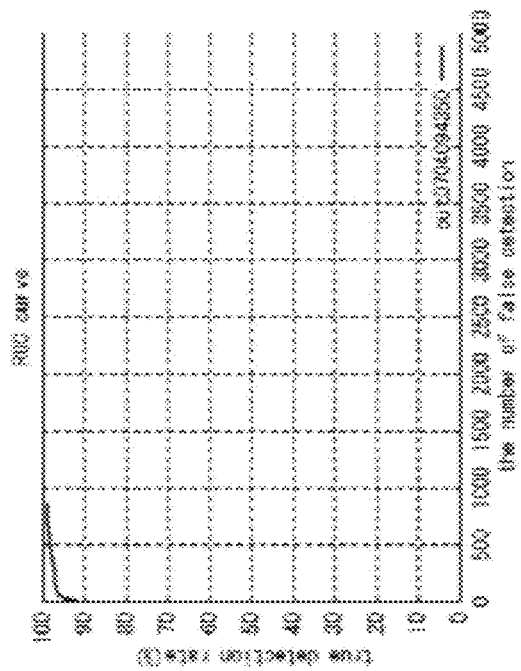
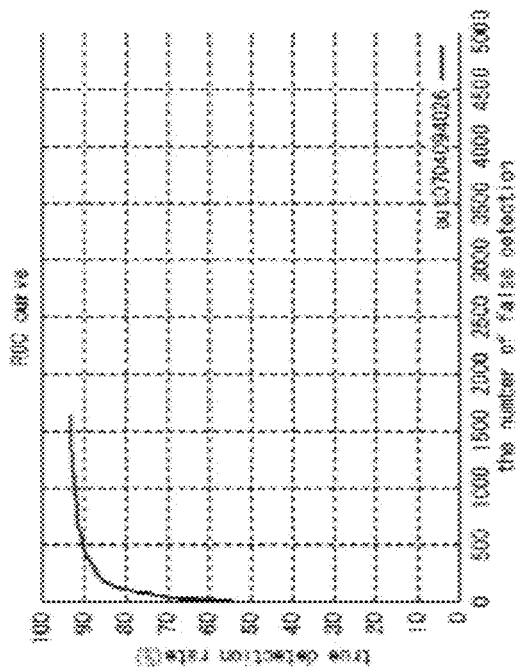
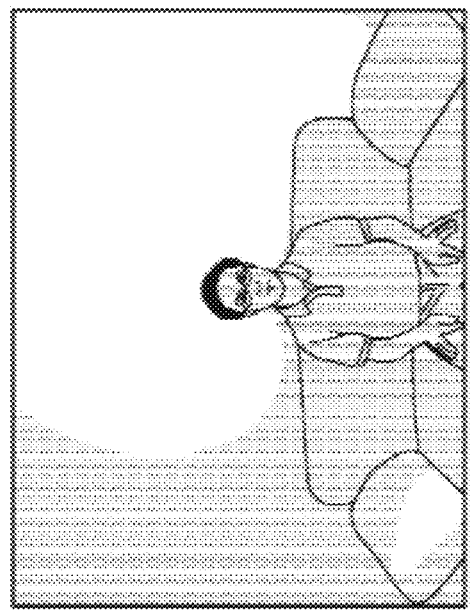
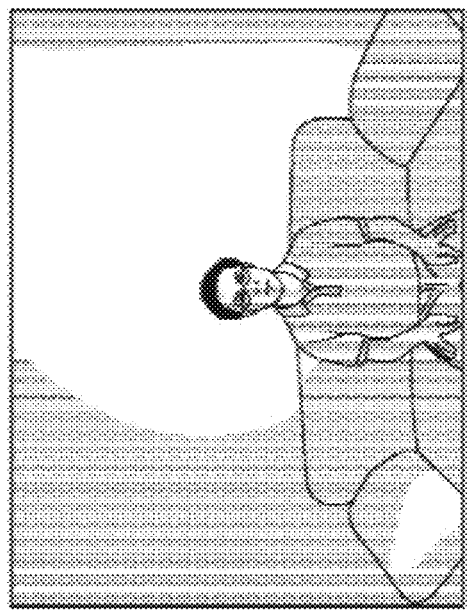
FIG. 8A
FIG. 8B

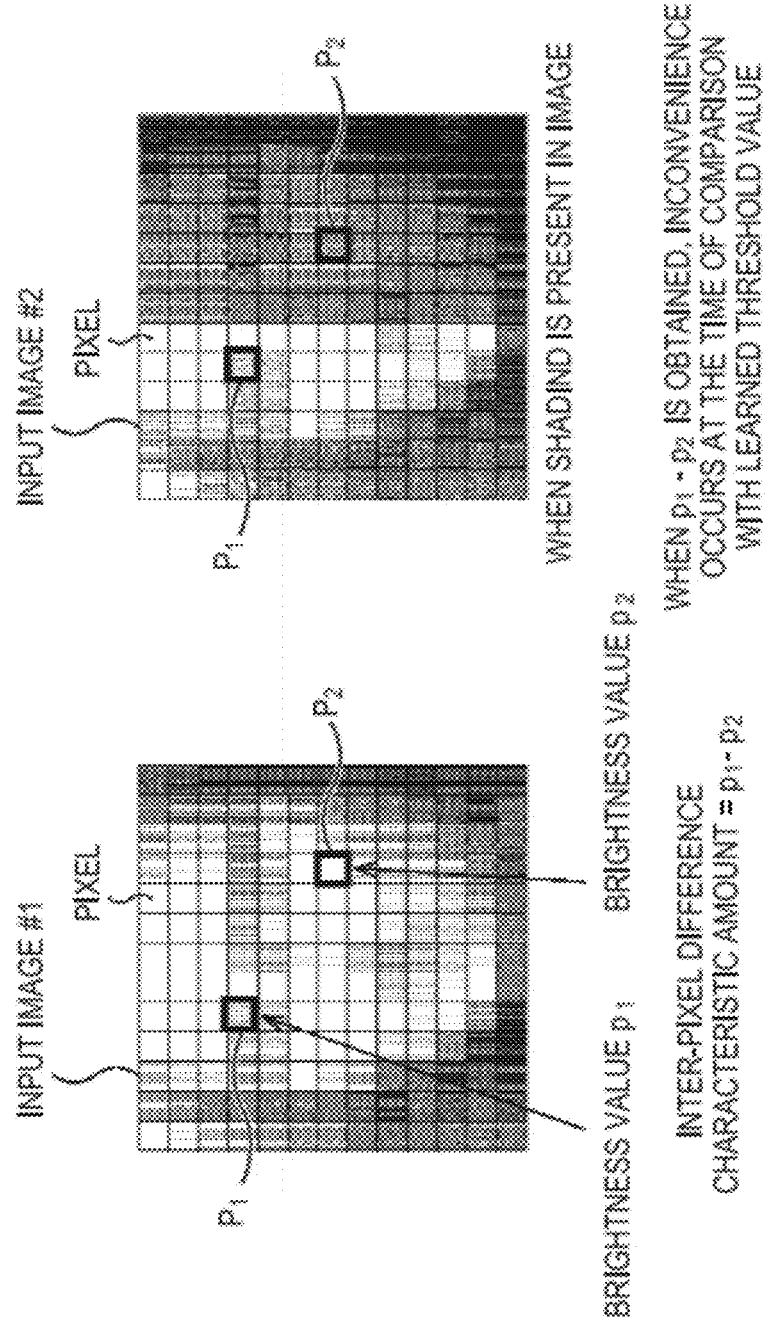

FIG.15
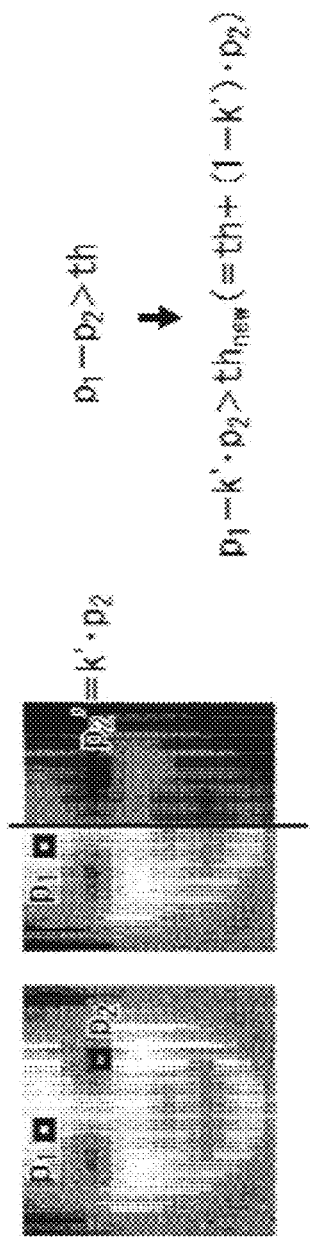
A. CASE OF WHICH ONE OF PIXEL PAIR IS PRESENT IN SIDE TO WHICH BRIGHTNESS CONVERSION FILTER IS APPLIED
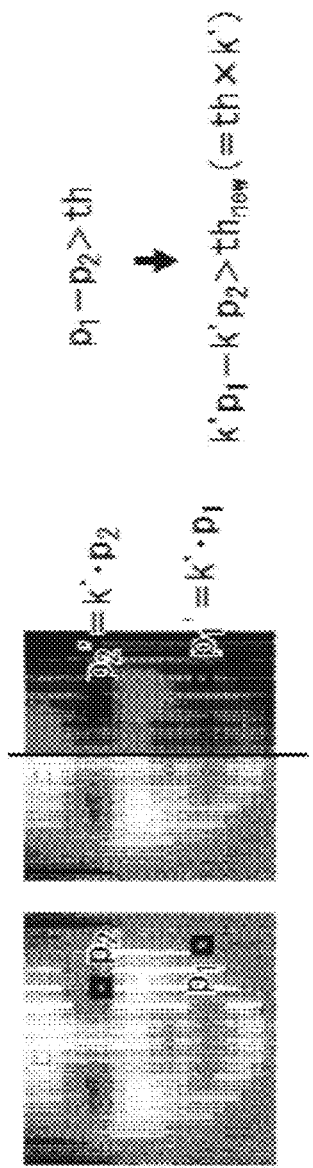
B. CASE OF WHICH ALL OF PIXEL PAIR IS PRESENT IN SIDE TO WHICH BRIGHTNESS CONVERSION FILTER IS APPLIED

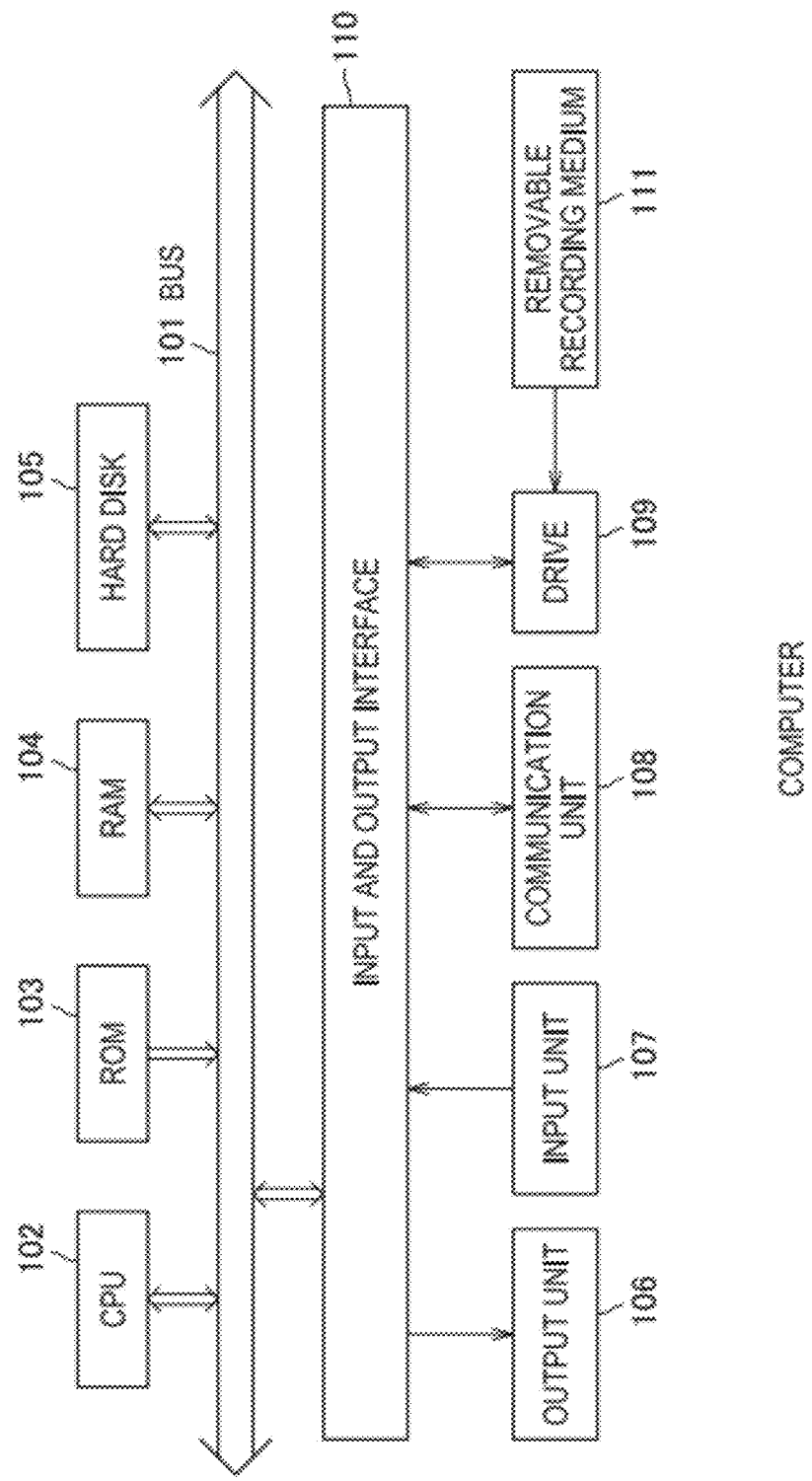

INFORMATION PROCESSING DEVICE, INFORMATION PROCESSING METHOD, AND PROGRAM

The present application claims priority from Japanese Patent Application No. JP 2011-114378 filed in the Japanese Patent Office on May 23, 2011, the entire content of which is incorporated herein by reference.

BACKGROUND

The present disclosure relates to an information processing device, an information processing method, and a program, and in particular, to an information processing device, an information processing method, and a program, which can easily prevent degradation of a discrimination performance of discriminating whether or not a predetermined target is reflected in an input image.

Ensemble learning, in which learning of an ensemble learner carrying out identification by virtue of majority vote of weak hypotheses that are outputs of a plurality of weak learners is carried out, includes boosting or bagging, for example.

In addition, a method of discriminating whether or not a predetermined target is reflected in an image obtained through the ensemble learning (a target discrimination method) using the ensemble learner has been proposed (see Japanese Patent Registration No. 4517633).

In Japanese Patent Registration No. 4517633, an inter-pixel difference characteristic amount that is obtained only by an extremely simple process such as subtraction and that is a difference between pixel values per two pixels in an input image is employed as an image characteristic amount, and the inter-pixel difference characteristic amount that may be calculated by the subtraction is used to realize sufficient discrimination performance to discriminate the target.

In addition, in Japanese Patent Registration No. 4517633, since locations of two pixels used to obtain the inter-pixel difference characteristic amount are set for every weak learner constituting the ensemble learner, it is necessary to calculate the inter-pixel difference characteristic amount corresponding to the number of weak learners constituting the ensemble learner.

However, the inter-pixel difference characteristic amount may be obtained by the very simple process such as subtraction, and the inter-pixel difference characteristic amount corresponding to the number of weak learners constituting the ensemble learner may be calculated at a high speed, so that the target discrimination process may be carried out at a high speed.

SUMMARY

In the ensemble learning, a learning image used for learning of the ensemble learner includes a positive image in which the target is reflected and a negative image in which the target is not reflected. For example, it is preferable that an image in which the entire target is properly illuminated with light illuminating the target without being biased if possible, that is, an image in which the entire target is uniformly illuminated by light from various directions without being biased (hereinafter referred to as a properly illuminated image), be used as the learning image including the positive and negative images or the input image that becomes a target to be discriminated using the ensemble learner.

Meanwhile, in an image captured by a camera, light illuminating the target is often biased, so that the target has the image in which the left side and the right side of the face are differently shaded (hereinafter referred to as a biasedly shaded image) even when the target is bilaterally symmetric to some extent as in a human face.

The biases of light illuminating the target in the biasedly shaded image as the learning image are averaged by carrying out learning of the ensemble learner using a plurality of the biasedly shaded images as the learning images even when the learning image is the biasedly shaded image, so that the ensemble learner carrying out learning using the properly illuminated image as the learning image may be obtained. As a result, the discrimination performance of discriminating the target may be degraded regardless of the characteristic amount of the image used to discriminate the target at the time of discriminating the target using the ensemble learner when the input image is the biasedly shaded image.

In light of the above situation, the present technology enables degradation of the discrimination performance of discriminating the target to be easily prevented.

An information processing device or a program for causing a computer to act as the information processing device according to an aspect of the present technology includes: a correction unit configured to correct parameters of an ensemble learner using correction information for correcting the parameters of the ensemble learner having a plurality of weak learners that receive characteristic amounts extracted from an input image and output weak hypotheses indicating whether or not a predetermined target is reflected in the input image, the correction information being calculated based on a light source illuminating the target; and a discrimination unit configured to integrate the weak hypotheses output from the weak learners with respect to the characteristic amounts using the ensemble learner of which the parameters are corrected and discriminate whether or not the target is reflected in the input image based on an integrated value of the weak hypotheses.

An information processing method according to another aspect of the present technology includes: correcting parameters of an ensemble learner using correction information for correcting the parameters of the ensemble learner having a plurality of weak learners that receive characteristic amounts extracted from an input image and output weak hypotheses indicating whether or not a predetermined target is reflected in the input image, the correction information being calculated based on a light source illuminating the target; and integrating the weak hypotheses output from the weak learners with respect to the characteristic amounts using the ensemble learner of which the parameters are corrected and discriminating whether or not the target is reflected in the input image based on an integrated value of the weak hypotheses.

According to still another aspect of the present technology, parameters of an ensemble learner using correction information for correcting the parameters of the ensemble learner having a plurality of weak learners that receive characteristic amounts extracted from an input image and output weak hypotheses indicating whether or not a predetermined target is reflected in the input image are corrected, and the correction information is calculated based on a light source illuminating the target. The weak hypotheses output from the weak learners with respect to the characteristic amounts are then integrated using the ensemble learner of which the parameters are corrected, and it is discriminated whether or not the target is reflected in the input image based on an integrated value of the weak hypotheses.

In addition, the information processing device may be a stand-alone device or may be an internal block included in one device.

In addition, a program may be transmitted through a transmission medium, or may be recorded on a recording medium and supplied.

According to an aspect of the present technology, it is possible to easily prevent degradation of the discrimination performance of discriminating the target.

BRIEF DESCRIPTION OF THE DRAWINGS

FIG. 5 is a diagram illustrating a method of obtaining a cut-out threshold value $R_t$;

FIG. 6 is a flow chart illustrating a discrimination process;

FIG. 7 is a flow chart illustrating a window image discrimination process;

FIG. 8 is a diagram illustrating input images (moving images) and receiver operating characteristic (ROC) curves when the discrimination process is performed on the input images as targets;

FIG. 9 is a diagram illustrating that a discrimination performance of discriminating a target using a biasedly shaded image as the target is degraded;

FIG. 15 is a diagram illustrating parameter correction of a standard learner;

FIG. 26 is a block diagram illustrating a configuration example of an embodiment of a computer to which the present technology is applied.

DETAILED DESCRIPTION OF THE EMBODIMENT(S)

Figure 1:
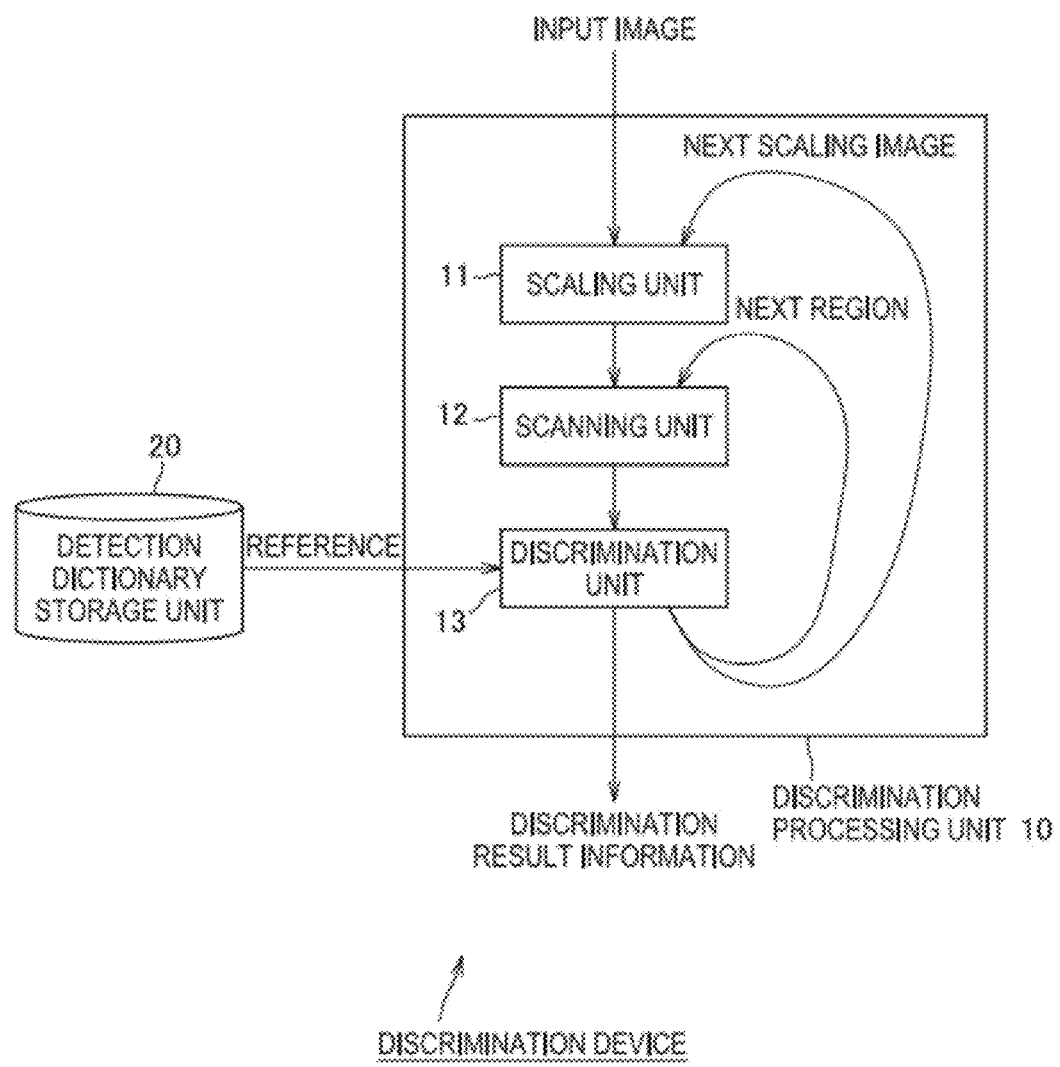
FIG. 1 is a block diagram illustrating a configuration example of a discrimination device carrying out target discrimination using an ensemble learner.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Prior to description of an embodiment of the present technology, ensemble learning and target discrimination obtained through the ensemble learning using an ensemble learner will be described in preparation for the previous stage.

[Discrimination Device Carrying Out Target Discrimination Using Ensemble Learner]

FIG. 1 is a block diagram illustrating a configuration example of a discrimination device carrying out target discrimination using an ensemble learner.

In FIG. 1, the discrimination device has a discrimination processing unit 10, and a detection dictionary storage unit 20.

An input image of a target on which target discrimination is performed is supplied from an outside to the discrimination processing unit 10.

The discrimination processing unit 10 performs, for example, target discrimination of discriminating whether or not a predetermined target such as a face of a human is reflected in the input image supplied (input) from the outside using (parameters of) the ensemble learner as the detection dictionary stored in the detection dictionary storage unit 20, and outputs the discrimination result.

The detection dictionary storage unit 20 stores (parameters of) the ensemble learner obtained by the ensemble learning as the detection dictionary for detecting (discriminating) the target.

In FIG. 1, the discrimination processing unit 10 has a scaling unit 11, a scanning unit 12, and a discrimination unit 13.

The scaling unit 11 is supplied with the input image that is the target on which the target discrimination is performed.

The scaling unit 11 reduces the input image with a reduction ratio under control of the discrimination unit 13, for example, by virtue of bilinear interpolation, and supplies the reduced image obtained by the reduction to the scanning unit 12 as a scaling image to which the input image is scaled.

The scanning unit 12 moves the location of the window on a scaling image by performing scanning such as raster scanning on the window of a predetermined size such as 20 (horizontal)×20 (vertical) pixels on the scaling image from the scaling unit 11 in accordance with control of the discrimination unit 13.

The scanning unit 12 then cuts out an image within the window (hereinafter, also referred to as a window image) in the scaling image, and supplies the window image to the discrimination unit 13.

The discrimination unit 13 discriminates whether or not a predetermined target such as a human face is reflected in the input image using the ensemble learner stored in the detection dictionary storage unit 20 and the window image supplied from the scanning unit 12 while controlling the scaling unit 11 and the scanning unit 12, and outputs discrimination result information indicating the discrimination result.

That is, the discrimination unit 13 controls the scaling unit 11 such that the input image is reduced with a predetermined reduction ratio.

The scaling unit 11 reduces the input image with the predetermined reduction ratio in accordance with control of the discrimination unit 13, and supplies the obtained reduced image to the scanning unit 12 as the scaling image.

In addition, the discrimination unit 13 controls the scanning unit 12 such that the window is moved in a raster scan order on the scaling image obtained by the scaling unit 11.

The scanning unit 12 repeatedly moves the window in a predetermined pixel number unit such as one pixel from the upper left of the scaling image toward the right and moves the window again from the left end toward the right by decreasing the predetermined pixel number such as one pixel when the window reaches the right end of the scaling image until the window reaches the lower right of the scaling image in accordance with control of the discrimination unit 13.

The scanning unit 12 then cuts out the window image that is an image within the window at a location after movement from the scaling image whenever the window is moved, and supplies the window image to the discrimination unit 13.

The discrimination unit 13 then performs the window image discrimination process of discriminating whether or not the target is reflected in the window image supplied from the scanning unit 12.

The discrimination unit 13 then controls the scaling unit 11 such that the input image is reduced with a smaller reduction ratio than the previous time when the window reaches the lower right of the scaling image, and the same process is repeatedly carried out from then on until the scaling image reaches (equal to or smaller than) the window size.

As mentioned above, the discrimination unit 13 may detect the targets of various sizes present in the input image by carrying out the window image discrimination process of discriminating whether or not the targets are reflected in the window images cut out from the scaling images obtained by reducing the input image with various reduction ratios.

In the window image discrimination process, the discrimination unit 13 extracts (calculates) the characteristic amount such as an inter-pixel difference characteristic amount from the window image from the scanning unit 12, and inputs the characteristic amount to the weak learners constituting the ensemble learner stored in the detection dictionary storage unit 20, thereby obtaining weak hypotheses that are outputs of the weak learners with respect to the characteristic amount.

The discrimination unit 13 then sequentially integrates the weak hypotheses output from the weak learners constituting the ensemble learner, and discriminates whether or not the target is reflected in the window image based on the integrated value.

[Learning Device Carrying Out Ensemble Learning]

Figure 2:
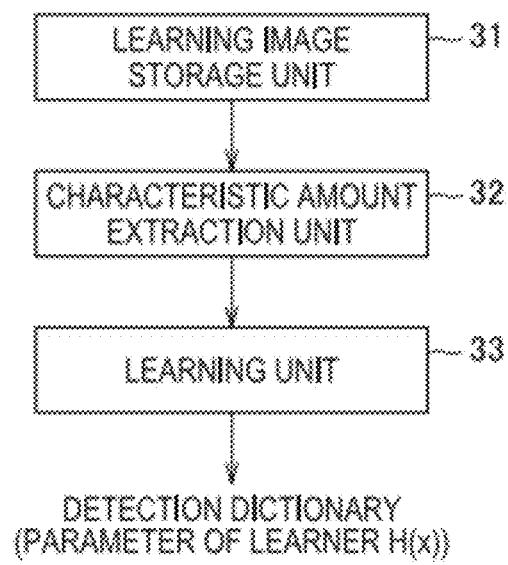
FIG. 2 is a block diagram illustrating a configuration example of a learning device carrying out ensemble learning of an ensemble learner stored in a detection dictionary storage unit 20.

FIG. 2 is a block diagram illustrating a configuration example of a learning device carrying out ensemble learning of an ensemble learner stored in a detection dictionary storage unit 20.

In FIG. 2, the learning device has a learning image storage unit 31, a characteristic amount extraction unit 32, and a learning unit 33.

The learning image storage unit 31 stores plural learning images used for ensemble learning.

The learning image is an image of the same size as the window, and positive images in which the target is reflected and negative images in which the target is not reflected are included in the plural learning images.

In addition, a label indicating which is correct between the positive image and the negative image (correct answer label) is attached to each of the learning images.

The characteristic amount extraction unit 32, for example, extracts the characteristic amount such as an inter-pixel difference characteristic amount that is a difference between pixel values of two pixels from the learning image stored in the learning image storage unit 31.

The learning unit 33 obtains and outputs (parameters of) the ensemble learner H(x) identifying that the target is present in the image by carrying out the ensemble learning using the plural learning images stored in the learning image storage unit 31, that is, using the inter-pixel difference characteristic amount x extracted from the plural learning images.

Here, the ensemble learner H(x) has T weak learners $h_1(x)$, $h_2(x)$, ..., $h_T(x)$ that output weak hypotheses indicating whether or not the target is reflected in the image using the inter-pixel difference characteristic amount x as an input.

The discrimination unit 13 of FIG. 1 extracts (calculates) the inter-pixel difference characteristic amount x from the window image, and inputs the inter-pixel difference characteristic amount x to the weak learners $h_1(x)$ to $h_T(x)$ constituting the ensemble learner to obtain the weak hypotheses $h_1(x), h_2(x), \ldots, h_T(x)$ that are outputs of the weak learners $h_1(x)$ to $h_T(x)$ with respect to the inter-pixel difference characteristic amount x.

That is, the weak learner $h_t(x)$ has one threshold value th as the parameter compared with the inter-pixel difference characteristic amount x that is an argument, and outputs +1 as the weak hypothesis $h_t(x)$ when x>th is satisfied and outputs −1 as the weak hypothesis $h_t(x)$ when x>th is not satisfied.

The discrimination unit 13 then carries out the window image discrimination process of discriminating whether or not the target is reflected in the window image based on the weighted majority vote by taking the weighted majority vote of the weak hypotheses output from the weak learners $h_t(x)$ constituting the ensemble learner.

That is, besides the threshold value th, the weak learners $h_t(x)$ have the reliability $\alpha_t$ as a parameter.

The discrimination unit 13 performs the window image discrimination process by sequentially integrating the weak hypotheses $h_t(x)$ output from the respective weak learners $h_t(x)$ constituting the ensemble learner using the reliability $\alpha_t$ as a weight and discriminating whether or not the target is reflected in the window image based on the obtained integrated value $\Sigma(\alpha_t \times h_t(x))(=\alpha_1 h_1(x)+\alpha_2 h_2(x)+ \ldots +\alpha_T h_T(x))$.

That is, when the integrated value $\Sigma(\alpha_t \times h_t(x))$ weighted by the reliability $\alpha_t$ of the weak hypothesis $h_t(x)$ is greater than 0 (when the sign is positive), it is discriminated that the window image is a positive image in which the target is reflected.

On the other hand, when the integrated value $\Sigma(\alpha_t \times h_t(x))$ is not greater than 0 (when the sign is not positive), it is discriminated that the window image is a negative image in which the target is not reflected.

The learning unit 33 obtains the threshold value th, the reliability $\alpha_t$, and pixel locations that are locations of two pixels used to obtain the inter-pixel difference characteristic amount x that is an argument of the weak learner $h_t(x)$, as the parameters of each of the weak learners $h_t(x)$ constituting the ensemble learner, by virtue of ensemble learning.

When the size of the window is, for example, 20 (horizontal)×20 (vertical) pixels, the size of the window image is also 20×20 pixels. The number of combinations (pixel location pairs) of pixel locations of two pixels used to extract the inter-pixel difference characteristic amount x from the window image of 20×20 pixels is then 79,800=400×399/2.

In addition, the learning unit 33 also obtains the cut-out length $R_t$ as the parameter of the weak learner $h_t(x)$. The cut-out length $R_t$ will be described later.

Here, as described above, the weak learner $h_t(x)$ outputting +1 or −1 as the weak hypothesis $h_t(x)$ using whether x>th is satisfied is referred to as a stump classifier.

That is, the stump classifier classifies the image into two classes indicating whether or not the target such as a human face is reflected using the characteristic amount x of the image, but identifies the image by virtue of the magnitude relation between the characteristic amount x and the threshold value th.

The class of the weak hypothesis as +1 is the class indicating that the target is reflected, and the class of the weak hypothesis as −1 is the class indicating that the target is not reflected.

In addition, the weak learners constituting the ensemble learner are not limited to the stump classifiers.

The ensemble learning of the ensemble learner H(x) having the stump classifiers $h_t(x)$ as the weak learners may be carried out, for example, by AdaBoost or the like that is one kind of boosting.

[Ensemble Learning]

Figure 3:
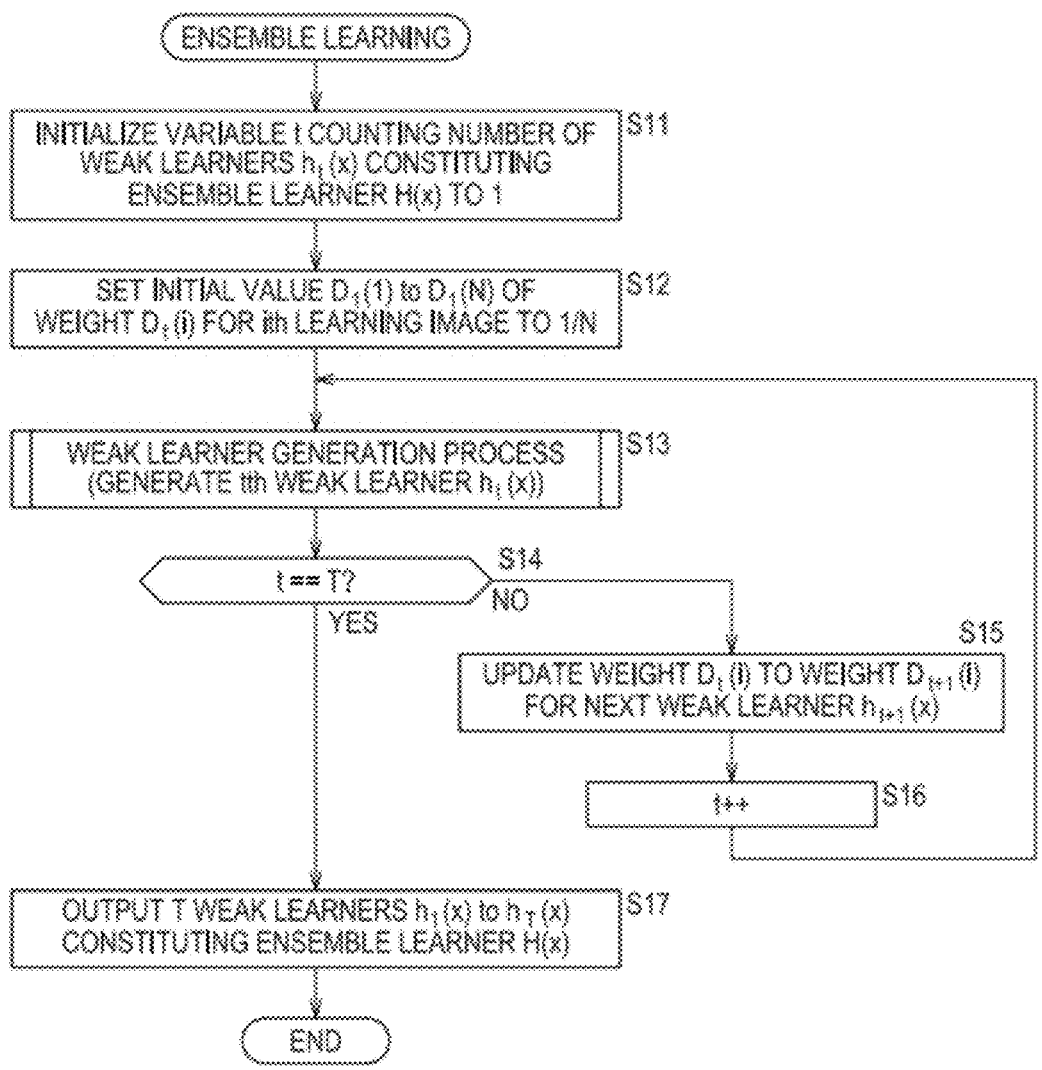
FIG. 3 is a flow chart illustrating an ensemble learning process of an ensemble learner H(x) carried out by a learning device.

FIG. 3 is a flow chart illustrating an ensemble learning process of the ensemble learner H(x) carried out by the learning device of FIG. 2.

The ensemble learning of FIG. 3 is the learning employing AdaBoost. However, aside from AdaBoost, the ensemble learning may be carried out, for example, using GentleBoost or the like.

Here, in the learning image storage unit 31 of the learning device (FIG. 2), N learning images each having the same size as the window used in the scanning unit 12 (FIG. 1) are stored, and the $i^{th}$ learning image among the N learning images is indicated as the learning image #i. In addition, the correct answer label of the $i^{th}$ learning image is indicated as $y_i$. For example, the correct answer label $y_i$ is +1 when the learning image #1 is a positive image, and is −1 when the learning image #1 is a negative image.

In step S11 of the ensemble learning, the learning unit 33 initializes the variable t counting the number of weak learners $h_t(x)$ constituting the ensemble learner to 1, and the process proceeds to step S12.

In step S12, the learning unit 33 initializes the weights $D_1(1)$ to $D_1(N)$ for the first weak learner $h_1(x)$ of the respective learning images #1 to #N stored in the learning image storage unit 31 to, for example, 1/N, and the process proceeds to step S13.

Here, $D_t(i)$ indicates the weight with respect to the $t^{th}$ weak learner $h_t(x)$ of the $i^{th}$ learning image #1.

In step S13, the learning unit 33 carries out the weak learner generation process of generating the $t^{th}$ weak learner $h_t(x)$, and the process proceeds to step S14.

In step S14, the learning unit 33 determines whether or not the variable t is equal to a predetermined total number T as the total number of the weak learners $h_t(x)$ constituting the ensemble learner.

In step S14, when it is determined that the variable t is not equal to the predetermined total number T, that is, when the weak learners $h_1(x)$ to $h_T(x)$ having the same number as the predetermined total number T are not yet generated, the process proceeds to step S15, and the learning unit 33 updates the weight $D_t(i)$ for the $t^{th}$ weak learner $h_t(x)$ of each of the learning image #i to a weight $D_{t+1}(i)$ for the $(t+1)^{th}$ weak learner $h_{t+1}(x)$ of each of the learning image #i that is to be obtained next, for example, in accordance with the AdaBoost algorithm.

That is, the learning unit 33 updates the weight $D_t(i)$ in accordance with equation (1) below.

$$D_t(i)=D_t(i)\exp(-y_i h_t(x_i)) \tag{1}$$

In equation (1), exp( ) indicates an exponential function using the Napier number e as a base, and $y_i$ indicates the correct answer label of the $i^{th}$ learning image #1.

In addition, $x_i$ indicates the inter-pixel difference characteristic amount extracted (calculated) from the $i^{th}$ learning image #i, and $h_t(x_i)$ indicates the weak hypothesis that the $t^{th}$ weak learner $h_t(x)$ generated in the immediately previous step S13 outputs with respect to the input of the inter-pixel difference characteristic amount $x_i$.

According to equation (1), the weight $D_t(i)$ is updated to a lower value when the sign of the correct answer label $y_i$ matches the sign of the weak hypothesis $h_t(x_i)$ (when the weak hypothesis $h_t(x_i)$ is the correct answer), and is updated to a higher value when the sign of the correct answer label $y_i$ does not match the sign of the weak hypothesis $h_t(x_i)$ (when the weak hypothesis $h_t(x_i)$ is not the correct answer).

The learning unit 33 then normalizes the updated weight $D_t(i)$ in accordance with equation (2), and obtains the normalized weight $D_t(i)$ as the weight $D_{t+1}(i)$ for the $(t+1)^{th}$ weak learner $h_{t+1}(x)$.

$$D_{t+1}(i)=D_t(i)/\Sigma_i D_t(i) \tag{2}$$

In equation (2), $\Sigma_i$ indicates summation of $D_t(i)$ (total sum of $D_t(i)$) by changing the variable i from 1 to N.

After the weight $D_{t+1}(i)$ for the $(t+1)^{th}$ weak learner $h_{t+1}(x)$ to be obtained next in each of the learning images #i is obtained in step S15 as described above, the process proceeds to step S16, and the learning unit 33 increments the variable t by 1.

The process thus returns to step S13 from step S16, and the same processes are repeatedly carried out from then on.

On the other hand, in step S14, when it is determined that the variable t is equal to the predetermined total number T, that is, when the weak learners $h_1(x)$ to $h_T(x)$ have the same number as the predetermined total number T, the process proceeds to step S17, and the learning unit 33 outputs the ensemble learner H(x) including (parameters of) the weak learners $h_1(x)$ to $h_T(x)$ as the detection dictionary, thereby finishing the ensemble learning process.

Figure 4:
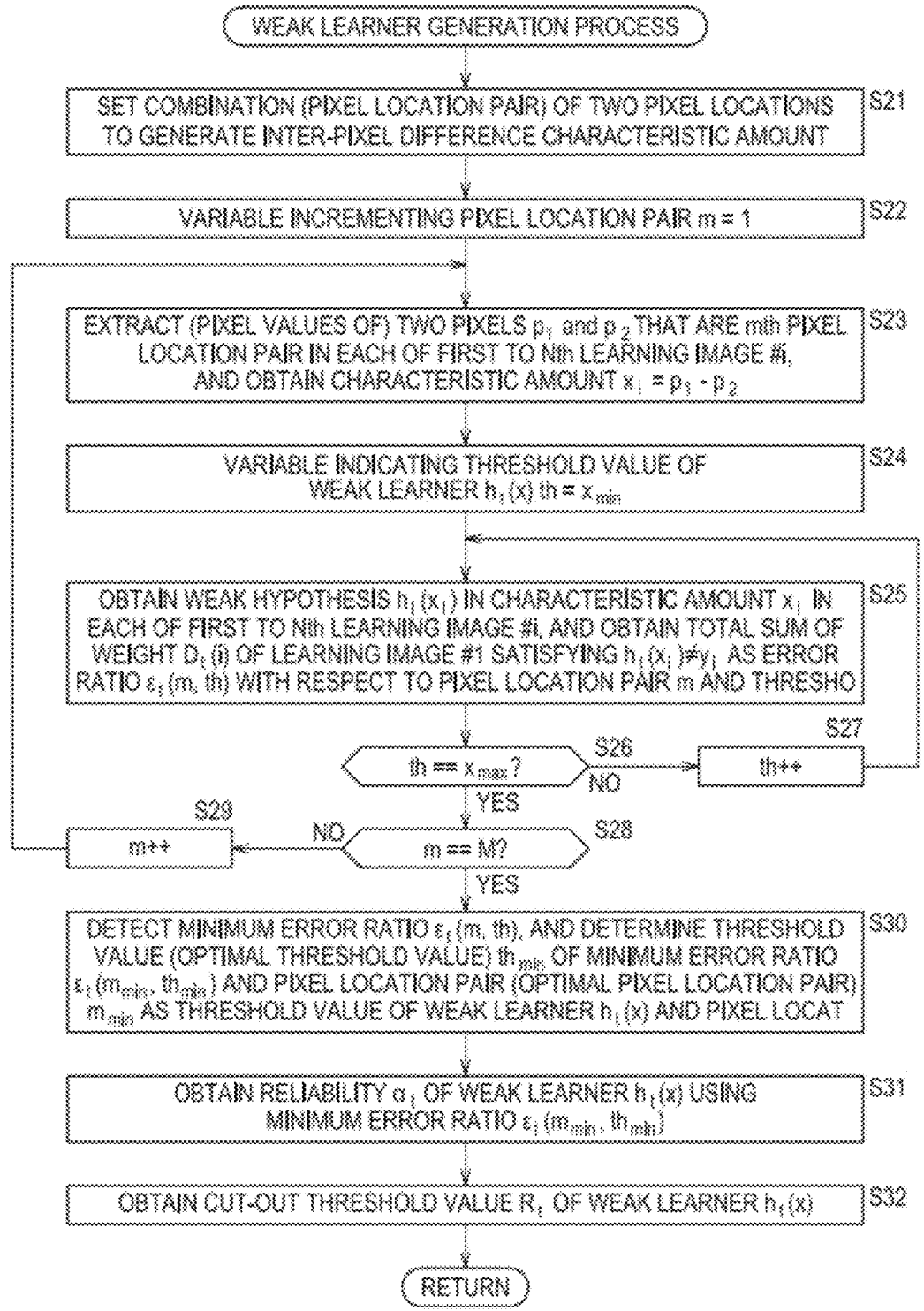
FIG. 4 is a flow chart illustrating a weak learner generation process of generating a weak learner $h_t(x)$.

FIG. 4 is a flow chart illustrating the weak learner generation process of generating the weak learner $h_t(x)$ in step S13 of FIG. 3 by the learning device of FIG. 2.

In step S21, the learning unit 33, for example, sets all combinations of locations of two pixels that may be selected from the learning image as the combinations (pixel location pairs) of locations of two pixels used to generate the inter-pixel characteristic amount as the characteristic amount.

Here, the number of all combinations of locations of two pixels that may be selected from the learning image is M.

In step S21, when pixel location pairs of M that is the number of all combinations of locations of two pixels that may be selected from the learning image are set, the process proceeds to step S22, the learning unit 33 initializes the variable m counting the M pixel location pairs to 1, and the process proceeds to step S23.

In step S23, the characteristic amount extraction unit 32 extracts pixel values (e.g., brightness) $p_1$ and $p_2$ of two pixels of the $m^{th}$ pixel location pair among the M pixel location pairs in each of the first to $N^{th}$ learning images #1 to #N stored in the learning image storage unit 31, and obtains a characteristic amount $x_i = p_1 - p_2$ that is the inter-pixel difference characteristic amount as the characteristic amount for the $t^{th}$ weak learner $h_t(x)$, and the process proceeds to step S24.

In step S24, the learning unit 33 sets $x_{min}$ as an initial value to the variable th indicating the threshold value as the parameter of the $t^{th}$ weak learner $h_t(x)$, and the process proceeds to step S25.

Here, for example, a minimum value or the like of values acquired as the inter-pixel difference characteristic amount represented by a predetermined bit number such as 8 bits or 16 bits is used as the initial value $x_{min}$.

In step S25, the learning unit 33 obtains the weak hypotheses $h_t(x_i)$ by applying the inter-pixel difference characteristic amount $x_i$ obtained from the learning image #i to the weak learner $h_t(x)$ having its threshold value as a variable th in each of the 1 to N learning images #1 to #N.

In addition, the learning unit 33 obtains the total sum of the weights $D_t(i)$ of the learning image #i of which the weak hypothesis $h_t(x_i)$ satisfies $h_t(x_i) \neq y_i$ in accordance with equation (3) below as an error ratio $\epsilon_t(m,th)$ in the pixel location pair m and the threshold value th.

$$\epsilon_t(m,th) = \Sigma D_t(i)[h_t(x_i) \neq y_i] \quad (3)$$

Here, $h_t(x_i) \neq y_i$ is 1 when $h_t(x_i) \neq y_i$ is satisfied, and is 0 when $h_t(x_i) \neq y_i$ is not satisfied in equation (3).

According to equation (3), the error ratio $\epsilon_t(m,th)$ is obtained by only adding the weight $D_t(i)$ of the false learning image $h_t(x_i)$ (learning image in which $h_t(x_i) \neq y_i$ is satisfied) that is an output of the weak learner $h_t(x)$ among the N learning images.

In step S25, when the error ratio $\epsilon_t(m,th)$ in the pixel location pair m and the threshold value th is obtained, the process proceeds to step S6, and the learning unit 33 determines whether or not the variable th is equal to a maximum value $x_{max}$ of values obtained as the inter-pixel difference characteristic amounts represented as a predetermined bit number.

In step S26, when it is determined that the variable th (indicating the threshold value) is not equal to the maximum value $x_{max}$, that is, when the threshold value th is a value less than the maximum value $x_{max}$, the process proceeds to step S27, and the learning unit 33 increments the variable th by 1.

The process then returns to step S25 from step S27, and the same processes are repeatedly carried out from then on.

In addition, in step S26, when it is determined that the threshold value th is equal to the maximum value $x_{max}$, the process proceeds to step S28, and the learning unit 33 determines whether or not the variable m is equal to the predetermined number M.

In step S28, when it is determined that the variable m is not equal to the predetermined number M, the process proceeds to step S29, and the learning unit 33 increments the variable m by 1.

The process then returns to step 23 from step S29, and the same processes are repeatedly carried out from then on.

In addition, in step S28, when it is determined that the variable m is equal to the predetermined number M, that is, when the error ratio $\epsilon_t(m,th)$ of the $t^{th}$ weak learner $h_t(x)$ is obtained in each of the pixel location pairs m equal to M and each of the thresholds th in a range of $x_{min} \leq th \leq x_{max}$, the process proceeds to step S30, and the learning unit obtains the minimum error ratio $\epsilon_t(m_{min}, th_{min})$ among the error ratios in each of the pixel location pairs m equal to M and each of the thresholds th in a range represented by $x_{min} \leq th \leq x_{max}$.

The learning unit 33 determines the threshold value $th_{min}$ (hereinafter, also referred to as a minimum threshold value) and the pixel location pair $m_{min}$ (hereinafter, also referred to as an optimal pixel location pair) when the minimum error ratio $\epsilon_t(m_{min}, th_{min})$ is obtained, as the threshold value as the parameter of the $t^{th}$ weak learner $h_t(x)$ and the pixel location pair for the argument x that obtains the inter-pixel characteristic amount of the argument x, respectively.

The process then proceeds from step S30 to step S31, the learning unit 33 obtains the reliability $\alpha_t$ as the parameter of the weak learner $h_t(x)$ using the minimum error ratio $e(m_{min}, th_{min})$ in accordance with equation (4) below, and the process proceeds to step S32.

$$\alpha_t = (1/2)\ln(1 - \epsilon_t(m_{min}, th_{min}))/\epsilon_t(m_{min}, th_{min})) \quad (4)$$

According to equation (4), the value of the reliability $\alpha_t$ decreases (increases) when the minimum error ratio $\epsilon_t(m_{min}, th_{min})$ increases (decreases). In addition, in equation (4), ln indicates the logarithm using the Napier number as a base.

In step S32, the learning unit 33 obtains the cut-out length $R_t$ as the parameter of the $t^{th}$ weak learner $h_t(x)$, and the process returns to step S14 (of FIG. 3).

FIG. 5 is a diagram illustrating a method of obtaining the cut-out threshold value $R_t$ in step S32 of FIG. 4.

The ensemble learner H(x) obtained through the ensemble learning includes T weak learners $h_1(x), h_2(x), \ldots, h_T(x)$, and is stored in the detection dictionary storage unit 20 (FIG. 1).

The discrimination unit 13 of FIG. 1 performs the window image discrimination process of discriminating whether or not the target is reflected in the window image supplied from the scanning unit 12 using the ensemble learner H(x) stored in the detection dictionary storage unit 20.

That is, in the window image discrimination process, the characteristic amount x (the inter-pixel difference characteristic amount in the present technology) extracted from the window image is applied to the ensemble learner H(x), and it is discriminated whether or not the target is reflected in the window image based on the identification value H(x) that is an output of the ensemble learner H(x) with respect to the characteristic amount x.

The identification value H(x) that is an output of the ensemble learner H(x) is a sign of the integrated value (weighted majority vote) of the weak hypotheses that are outputs of the weak learners $h_t(x)$ constituting the ensemble learner H(x), and is represented as in equation (5) below.

$$H(x) = \mathrm{sgn}\{\Sigma_t \alpha_t h_t(x)\} \quad (5)$$

In equation (5), $\Sigma_t$ indicates a summation of the weighted values $\alpha_t h_t(x)$ of which the reliability $\alpha_t$ of the weak hypotheses $h_t(x)$ is weighted by changing the variable t from 1 to T. In addition, sgn indicates the sign within the brackets { } (the sign of 0 is considered as either (e.g., negative) of positive and negative).

It is discriminated that the target is reflected in the window image when the identification value H(x) of equation (5) is positive and that the target is not reflected in the window image when the identification value is not positive.

In the window image discrimination process, the weighted value $\alpha_t h_t(x)$ of the weak hypothesis $h_t(x)$ is obtained and integrated while the variable t is sequentially changed from 1 to T at the time of obtaining the identification value H(x) of equation (5).

That is, the identification value H(x) of equation (5) is obtained by repeatedly obtaining the weak hypotheses $h_t(x)$ and integrating the weighted values $\alpha_t h_t(x)$ of the weak hypotheses $h_t(x)$ to the integrated values of the weighted values $\alpha_1 h_1(x)$ to $\alpha_{t-1} h_{t-1}(x)$ of the weak hypotheses $h_1(x)$ to $h_{t-1}(x)$ that are already obtained.

FIG. 5 illustrates an example of the change in variable t of the integrated value (hereinafter, also referred to as an integrated value of the t weak hypotheses $\Sigma \alpha_t h_t(x)$) (of the weighted values $\alpha_1 h_1(x)$ to $\alpha_t h_t(x)$) of the t weak hypotheses $h_1(x)$ to $h_t(x)$.

In addition, FIG. 5 illustrates an integrated value $\Sigma h_t(x)$ of the t weak hypotheses in each of 5 window images #1, #2, #3, #4, and #5.

The window images #1 to #4 are positive images and the remaining window image #5 is a negative image in the 5 window images.

In addition, the cut-out threshold value $R_t$ is also illustrated in FIG. 5.

The integrated value $\Sigma \alpha_t h_t(x)$ of the t weak hypotheses is equal to or higher than the cut-out threshold value $R_t$ regardless of the number of variables t (the number of integrated weak hypotheses) in the window images #1 to #4 that are positive images.

On the other hand, the integrated value $\Sigma \alpha_t h_t(x)$ of the t weak hypotheses is less than the cut-out threshold value $R_t$ when the variable t becomes a certain value in the window image #5 that is a negative image.

When the identification value $H(x)$ of equation (5) is obtained, the weak hypotheses $h_t(x)$ are sequentially obtained while changing the variable t from 1 to T, and the weighted values $\alpha_t h_t(x)$ of the weak hypotheses $h_t(x)$ are integrated to obtain the integrated value $\Sigma \alpha_t h_t(x)$ of the t weak hypotheses. However, when the integrated value $\Sigma \alpha_t h_t(x)$ of the t weak hypotheses is less than (or equal to or less than) the cut-out threshold value $R_t$, integration (of the weighted values $\alpha_t h_t(x)$) of the weak hypotheses $h_t(x)$ is terminated (stopped).

In addition, when the integration of the weak hypotheses $h_t(x)$ is terminated, it is discriminated that the target is not reflected in the window image (the window image is a negative image).

The cut-out threshold value $R_t$ compared with the integrated value $\Sigma \alpha_t h_t(x)$ of the t weak hypotheses is obtained using the positive image among N learning images in the learning unit 33.

That is, when L positive images are included in the N learning images and the inter-pixel difference characteristic amount that is extracted from the $j^{th}$ positive image among the L positive images is represented as $x_j$, the learning unit 33 obtains the integrated value $\Sigma \alpha_t h_t(x_j)$ of the t weak hypotheses in each of the L positive images #j.

The learning unit 33 then obtains the minimum value of the integrated values $\Sigma \alpha_t h_t(x_j)$ of the t weak hypotheses in the respective L positive images #j as the cut-out threshold value $R_t$.

In particular, the learning unit 33 obtains the cut-out threshold value $R_t$, for example, in accordance with equation (6) below.

$$R_t = \min\{\Sigma_i \alpha_i h_i(x_1), \Sigma_i \alpha_i h_i(x_2), \ldots, \Sigma_i \alpha_i h_i(x_L), 0\} \quad (6)$$

In equation (6), $\Sigma_i$ indicates the summation (of the weighted values $\alpha_i h_i(x_j)$) of the weak hypotheses $h_i(x_j)$) while the variable i is changed from 1 to t. In addition, min{ } indicates the minimum value of values within the brackets { }.

According to equation (6), the minimum value of the integrated values $\Sigma \alpha_i h_i(x_j) = \alpha_1 h_1(x_j) + \alpha_2 h_2(x_j) + \ldots + \alpha_t h_t(x_j)$ of the t weak hypotheses in each of the L positive images #j is obtained as the cut-out threshold value $R_t$.

In addition, in equation (6), when the minimum value of the integrated values $\Sigma \alpha_i h_i(x_j) = \alpha_1 h_1(x_j) + \alpha_2 h_2(x_j) + \ldots + \alpha_t h_t(x_j)$ of the t weak hypotheses in each of the L positive images #j is greater than 0, the cut-out threshold value $R_t$ is 0.

The cut-out threshold value $R_t$ obtained as in equation (6) is thus limited to a value equal to or less than 0.

In addition, a method of limiting the cut-out threshold value $R_t$ (including whether or not the cut-out threshold value $R_t$ is limited, aside from the value in which the cut-out threshold value $R_t$ is limited) depends on the ensemble learning method (class).

[Discrimination Process]

FIG. 6 is a flow chart illustrating a target discrimination process (discrimination process) causing the discrimination device of FIG. 1 to discriminate whether or not the target is reflected in the input image.

Hereinafter, for example, a human face is employed as the target.

In this case, the scaling unit 11 waits for an input image to be supplied from outside, reduces the input image from outside and supplies the image obtained by reduction to the scanning unit 12 as the scaling image that is scaled from the input image in step S51, and the process proceeds to step S52.

Here, in the scaling unit 11, when step S51 is carried out for the first time after the input image from outside is supplied, the input image is reduced with a reduction ratio of 1. In this case, the input image in which the size is not reduced is thus supplied as the scaling image from the scaling unit 11 to the scanning unit 12.

In step S52, the scanning unit 12 sets the window of a predetermined size such as 20×20 pixels in an upper left location of the scaling image from the scaling unit 11, and the process proceeds to step S53.

In step S53, the scanning unit 12 cuts out the image within the window from the scaling image and supplies the cut-out image to the discrimination unit 13 as the window image, and the process proceeds to step S54.

In step S54, the discrimination unit 13 performs the window image discrimination process of discriminating whether or not the target is reflected in the window image from the scanning unit 12 using the ensemble learner stored in the detection dictionary storage unit 20, and the process proceeds to step S55.

Here, the window image discrimination process carried out by the discrimination unit 13 will be described later. However, it is discriminated whether or not the window image is the positive image in which the target of the human face is reflected or the negative image in which the human face is not reflected in the window image discrimination process.

In step S55, the discrimination unit 13 discriminates whether or not the window is located in a lower right location of the scaling image.

In step S55, when it is discriminated that the window is not located in the lower right location of the scaling image, the process proceeds to step S56, and the discrimination unit 13 controls the scanning unit 12 such that the window is moved.

The scanning unit 12 moves the window on the scaling image to the next location in a raster scan order in accordance with control of the discrimination unit 13, and the process returns to step S53 from step S56.

In step S53, the scanning unit 12 cuts out the image within the moved window from the scaling image and supplies the cut-out image to the discrimination unit 13 as the window image, and the same processes are repeatedly carried out from then on.

In addition, in step S55, when it is determined that the window is located in the lower right location of the scaling image, the process proceeds to step S57, and the discrimination unit 13 determines whether or not the size of the scaling image matches the size of the window.

In step S57, the process proceeds to step S58 when it is determined that the size of the scaling image does not match the size of the window, that is, when the size of the scaling image is greater than the size of the window, the discrimination unit 13 controls the scaling unit 11 such that the input image is reduced with a smaller reduction ratio than that of the previous time (a reduction ratio by which the input image is further reduced), and the process returns to step S51.

In step S51, the scaling unit 11 reduces the input image in accordance with control of the discrimination unit 13 and supplies the obtained image having the further reduced size from the previous time to the scanning unit 12 as the scaling image, and the same processes are repeatedly carried out from then on.

In addition, in step S57, when it is determined that the size of the scaling image matches the size of the window, that is, when the input image is reduced up to the window of the same size in the scaling unit 11, the process proceeds to step S59, the discrimination unit 13 detects regions on the input image corresponding to the window image that is discriminated as a positive image from the input image as target regions in which the target is reflected in the window image discrimination process of step S54 carried out so far, and the process proceeds to step S60.

In step S60, the discrimination unit 13 determines whether or not the target region is present in the input image, that is, determines whether or not at least one target region is detected from the input image in step S59.

In step S60, when it is determined that the target region is not present in the input image, that is, when the window image discriminated as a positive image is not present in the window images obtained from the input image so that the human face is not reflected in the input image in the window image discrimination process, the process proceeds to step S61, the discrimination unit 13, for example, outputs the parameter or the like indicating that the target is not present as the discrimination result information indicating the discrimination result of presence of the target in the input image, and the discrimination process is thus finished.

In addition, in step S60, when it is determined that the target region is present in the input image, that is, when it is determined that the at least one target region is present in the input image, the process proceeds to step S62, and the discrimination unit 13 discriminates whether or not target regions overlapping each other are present in the target regions present in the input image.

In step S62, when it is determined that the target regions overlapping each other are present in the target regions present in the input image, that is, when the plural target regions are present in the input image and target regions overlapping each other are present in the plural target regions, the process proceeds to step S63, and the discrimination unit 13 selects any two target regions overlapping each other among the target regions overlapping each other in the input image and excludes one of the two target regions overlapping each other, that is, for example, one having a smaller evaluation value s that will be described later and is obtained in the window image discrimination process from the target regions.

The process then returns to step S62 from step S63, and the processes of steps S62 and S63 are repeatedly carried out until it is determined that there are no target regions overlapping each other in the target regions present in the input image in step S62.

When it is determined that there are no target regions overlapping each other in the target regions present in the input image in step S62, the process proceeds to step S61, the discrimination unit 13 outputs, for example, the parameter or the like indicating the presence of the target or the input image in which the target region surrounded by a frame is displayed as the discrimination result information indicating the discrimination result of presence of the target in the input image, and the discrimination process is finished.

FIG. 7 is a flow chart illustrating the window image discrimination process carried out in step S54 of FIG. 6.

In step S71, the discrimination unit 13 initializes the variable t counting the T weak learners $h_1(x), h_2(x), \ldots, h_T(x)$ constituting the ensemble learner H(x) stored in the detection dictionary storage unit 20 to 1.

In addition, in step S71, the discrimination unit 13 initializes the evaluation value s evaluating the window image to discriminate whether or not the target is reflected in the window image from the scanning unit 12 to 0, and the process proceeds to step S72.

In step S72, the discrimination unit 13 extracts the inter-pixel difference characteristic amount x applied to the $t^{th}$ weak learner $h_t(x)$ from the window image from the scanning unit 12.

Here, the pixel location pair m that is the parameter of the weak learner $h_t(x)$ indicates the pixel locations $P_1$ and $P_2$ of two pixels on the window image that are used to obtain the inter-pixel difference characteristic amount x.

The discrimination unit 13 extracts the pixel values $p_1$ and $p_2$ of the respective pixel locations $P_1$ and $P_2$ indicating the pixel location pair m that is the parameter of the weak learner $h_t(x)$ from the window image, and obtains the inter-pixel difference characteristic amount $x=p_1-p_2$ by subtraction between the pixel values $p_1$ and $p_2$.

The process then proceeds to step S73 from step S72, the discrimination unit 13 applies the inter-pixel difference characteristic amount x obtained in the immediately previous step S72 to the $t^{th}$ weak learner $h_t(x)$ and obtains the weak hypothesis $h_t(x)$ by calculating the weak learner $h_t(x)$, and the process proceeds to step S74.

Here, in step S73, the threshold value th of the weak learner $h_t(x)$ and the inter-pixel difference characteristic amount x are compared to calculate the weak learner $h_t(x)$. +1 is obtained as the weak hypothesis $h_t(x)$ when x>th is satisfied, and −1 is obtained as the weak hypothesis $h_t(x)$ when x>th is not satisfied.

In step S74, the discrimination unit 13 obtains the weighted value $\alpha_t h_t(x)$ of the weak hypothesis $h_t(x)$. In addition, the discrimination unit 13 updates the evaluation value s by adding the weighted value $\alpha_t h_t(x)$ of the weak hypothesis $h_t(x)$ to the evaluation value s, and the process proceeds to step S75 from step S74.

Here, the updated evaluation value s obtained in step S74 is the integrated value $\Sigma \alpha_t h_t(x)$ of the t weak hypotheses described with reference to FIG. 5, and updating of the evaluation value s obtained in step S74 is also integration (of the weighted values $\alpha_t h_t(x)$) of the weak hypotheses $h_t(x)$ for obtaining the identification value H(x) that is an output of the ensemble learner H(x) of equation (5).

In step S75, the discrimination unit 13 determines whether or not the evaluation value s is a value greater than the cut-out threshold value $R_t$ that is the parameter of the $t^{th}$ weak learner $h_t(x)$.

In step S75, when it is determined that the evaluation value s is a value greater than the cut-out threshold value $R_t$, the process proceeds to step S76, and the discrimination unit 13 determines whether or not the variable t is equal to the number T of the weak learners $h_t(x)$ constituting the ensemble learner $H(x)$.

In step S76, when it is determined that the variable t is not equal to the number T of the weak learners $h_t(x)$ constituting the ensemble learner $H(x)$, the process proceeds to step S77, and the discrimination unit 13 increments the variable t by 1.

The process then returns to step S72 from step S77, and the same processes are repeatedly carried out from then on.

In addition, in step S76, when it is determined that the variable t is equal to the number T of the weak learners $h_t(x)$ constituting the ensemble learner $H(x)$, that is, when the integration represented as the summation in the right side of equation (5) for obtaining the identification value $H(x)$ is performed on the entire weak hypotheses $h_t(x)$ of the T weak learners $h_t(x)$ constituting the ensemble learner $H(x)$, the process proceeds to step S78, and the discrimination unit 13 determines whether or not the evaluation value s is greater than the threshold value 0.

In step S78, when it is determined that the evaluation value s is not greater than the threshold value 0, that is, when the identification value $H(x)$ that is the sign (of $\Sigma_t \alpha_t h_t(x)$ of the right side of equation (5)) of the integrated value $\Sigma_t \alpha_t h_t(x)$ with respect to all weak hypotheses $h_t(x)$ of the T weak learners $h_t(x)$ constituting the ensemble learner $H(x)$ is not positive, the process proceeds to step S79, the discrimination unit 13 discriminates that the window image is a negative image, and the process returns to step S55 (of FIG. 6).

In addition, in step S75, when it is also determined that the evaluation value s is a value not greater than the cut-out threshold value $R_t$, the process proceeds to step S79, the discrimination unit 13 discriminates that the window image is a negative image, and the process returns to step S55 (of FIG. 6).

Accordingly, when the evaluation value s, that is, the integrated value $\Sigma \alpha_t h_t(x)$ of the t weak hypotheses, is a value not greater than the cut-out threshold value $R_t$, updating of the evaluation value s carried out in step S74, that is, integration of the weak hypotheses $h_t(x)$ for obtaining the identification value $H(x)$ that is an output of the ensemble learner $H(x)$ of equation (5), is stopped.

When the integrated value $\Sigma \alpha_t h_t(x)$ of the t weak hypotheses is a value not greater than the cut-out threshold value $R_t$, the possibility that the window image is a positive image is extremely low, and it is thus possible to perform the discrimination process (FIG. 6) at a high speed (in a short time) by stopping the integration of the weak hypotheses $h_t(x)$ when the integrated value $\Sigma \alpha_t h_t(x)$ of the t weak hypotheses becomes a value not greater than the cut-out threshold value $R_t$.

On the other hand, in step S78, when it is determined that the evaluation value s is greater than the threshold value 0, that is, when the identification value $H(x)$ that is the sign (of $\Sigma_t \alpha_t h_t(x)$ of the right side of equation (5)) of the integrated value $\Sigma_t \alpha_t h_t(x)$ with respect to all weak hypotheses $h_t(x)$ of the T weak learners $h_t(x)$ constituting the ensemble learner $H(x)$ is positive, the process proceeds to step S80, the discrimination unit 13 discriminates that the window image a positive image, and the process returns to step S55 (of FIG. 6).

FIG. 8 is a diagram illustrating input images (moving images) and ROC curves when the discrimination process is performed on the input image in the discrimination device of FIG. 1.

The input images of FIG. 8A and FIG. 8B are both positive images in which the same human face is reflected as a target.

However, the entire target in the input image of FIG. 8A is illuminated with as little bias as possible, and the input image of FIG. 8A is thus an image in which the entire target is properly illuminated (a properly illuminated image).

On the other hand, external light is incident on (toward) the right side in the input image of FIG. 8B, so that the input image of FIG. 8B is an image in which the right side of the target of the human face is bright and the left side is dark (the left side (rather than the right side) is shaded) (a biasedly shaded image).

The ROC curve has a higher (better) discrimination performance of discriminating the target when the curve is closer to the upper left corner.

In FIG. 8, the ROC curve of the input image of FIG. 8A approaches the upper left corner. However, the ROC curve of the input image of FIG. 8B is spaced slightly away from the upper left corner.

That is, in the biasedly shaded image that is the input image of FIG. 8B, the discrimination performance of discriminating the target is degraded due to shading of the left side of the human face generated by the external light.

FIG. 9 is a diagram illustrating that the discrimination performance of discriminating the target using the biasedly shaded image as the target is degraded in the discrimination device of FIG. 1.

FIG. 9 illustrates (window images cut out from) two input images #1 and #2 that are positive images in which the target of the human face is reflected.

However, the input image #1 is a properly illuminated image in which the target of the entire human face is properly illuminated, and the input image #2 is a biasedly shaded image in which the right side (rather than the left side) of the target of the human face is shaded.

In FIG. 9, the inter-pixel difference characteristic amount $x=p_1-p_2$ obtained from the pixel value $p_1$ of the pixel location $P_1$ on the left side of the input image and the pixel value $p_2$ of the pixel location $P_2$ on the right side of the input image is compared with the threshold value th of the weak learner $h_t(x)$ in the target discrimination.

In the input image #2 that is the biasedly shaded image in which the right side (rather than the left side) of the target of the human face is shaded, the inter-pixel difference characteristic amount $x=p_1-p_2$ that is compared with the threshold value th of the weak learner $h_t(x)$ is a greatly different value in comparison with the value obtained in the input image #1 that is the properly illuminated image, so that the weak hypothesis $h_t(x)$ of the weak learner $h_t(x)$ may be adversely affected and the discrimination performance of discriminating the target may be degraded.

Figure 10:
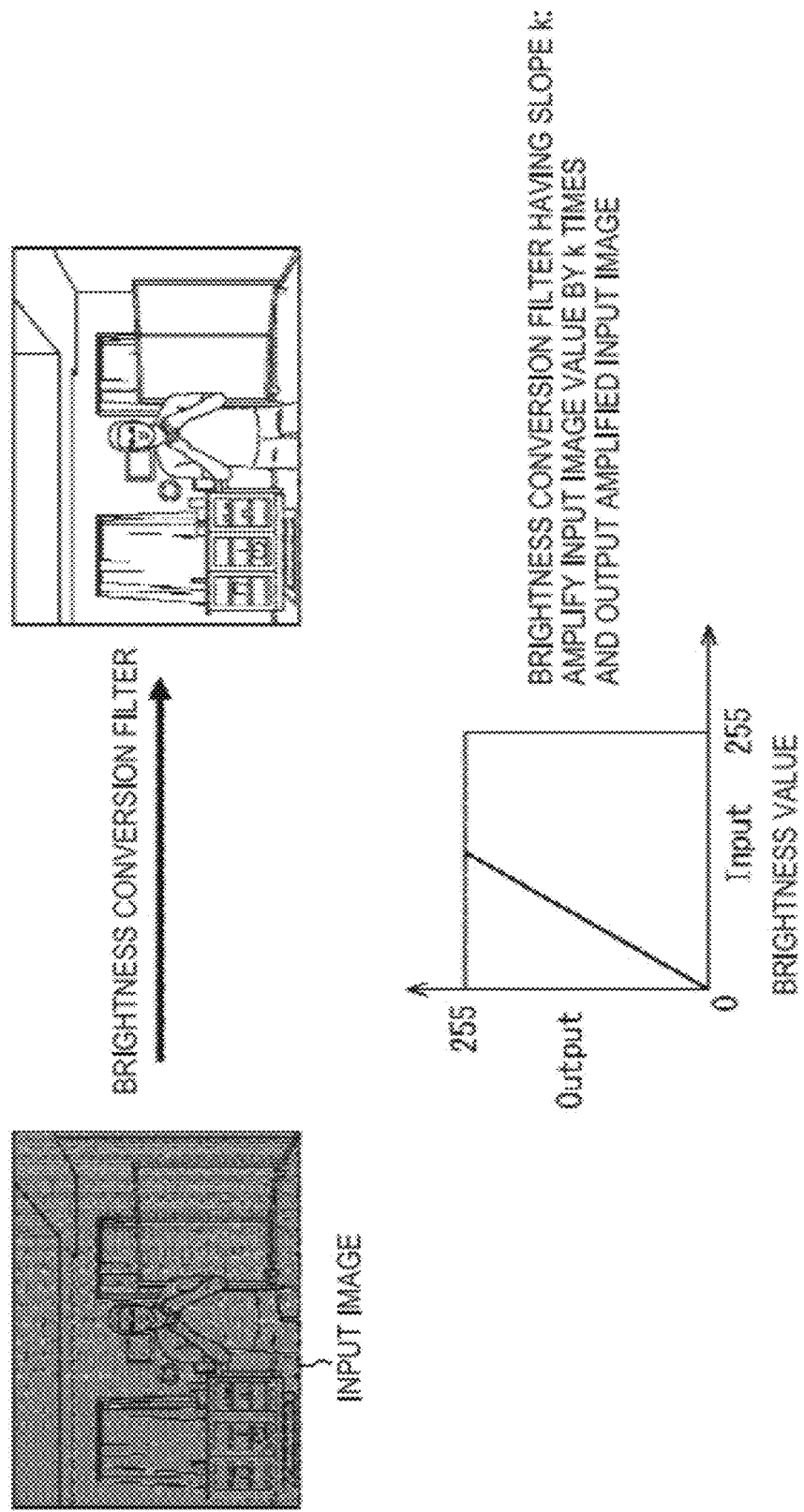
FIG. 10 is a diagram illustrating a processing method when an input image is not a properly illuminated image in which an entire target is properly illuminated.

FIG. 10 is a diagram illustrating a processing method when the input image is not the properly illuminated image in which the entire target is properly illuminated.

The entire input image is dark in FIG. 10.

In the input image that is entirely dark, it is possible to cause the brightness distribution of the input image to become a brightness distribution in a suitable range by applying the filter converting the brightness to k times the brightness where k is a predetermined number equal to or higher than 1 to the entire input image.

It is thus possible to prevent the discrimination performance from being degraded by performing the discrimination process on the properly illuminated image as the input image having the proper brightness distribution using the brightness conversion filter.

Here, k times the pixel value p is output from the brightness conversion filter. The relation between the input value Input input to the brightness conversion filter and the output value Output output from the brightness conversion filter is represented as Output=k×Input.

In addition, when the input image is too bright, the input image is converted to the properly illuminated image having a proper brightness distribution using the brightness conversion filter converting the brightness to k times the brightness where k is a predetermined number equal to or lower than 1.

Accordingly, when the entire input image is dark (or too bright), it is possible to prevent the discrimination performance from being degraded by applying the brightness conversion filter to the entire input image to convert the input image to the image with a proper brightness distribution. However, when the input image is partially dark, it is necessary to apply the brightness conversion filter only to the dark portion in order to prevent the discrimination performance from being degraded.

That is, for example, when the input image is the biasedly shaded image in which the human face is reflected as the target illuminated by light (external light) from the right side as shown in FIG. 8B, the right side of the human face is bright and the left side is dark, and it is thus necessary to partially apply the brightness conversion filter converting the pixel value p to k times the pixel value where k is a predetermined number equal to or higher than 1 only to the left side on which shading occurs.

Figure 11:
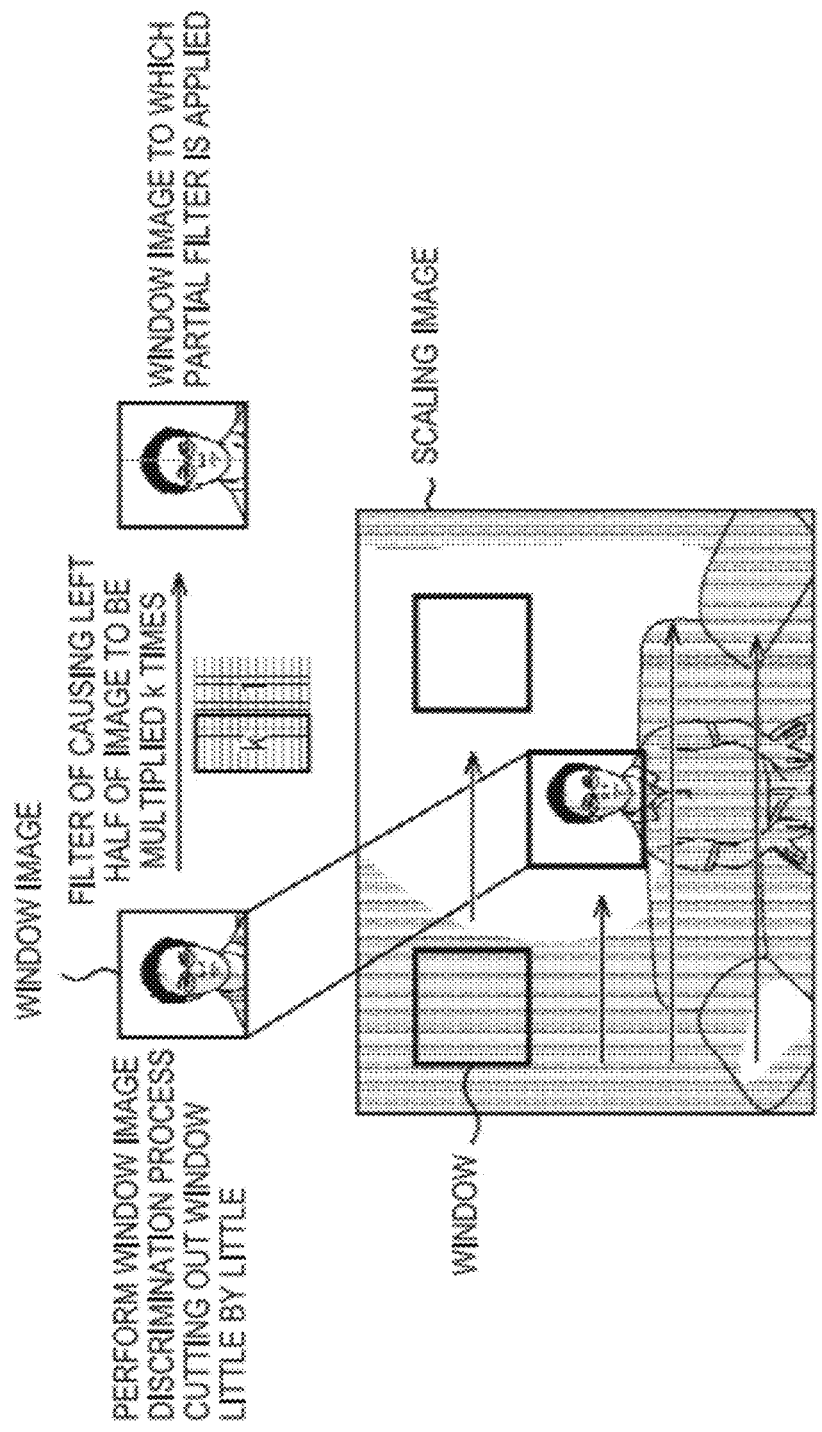
FIG. 11 is a diagram illustrating a case to which a brightness conversion filter is partially applied.

FIG. 11 a diagram illustrating a case in which the brightness conversion filter is partially applied in the discrimination process of FIG. 6 carried out by the discrimination device of FIG. 1.

When the brightness conversion filter is partially applied in the discrimination process of FIG. 6 carried out by the discrimination device of FIG. 1, before the window image discrimination process (step S54 of FIG. 6) is carried out after the input image is scaled and the window image is then cut out from the scaling image, it is necessary to perform the partial filter process of partially applying the brightness conversion filter to the window image.

It is thus necessary to perform the partial filter process on all window images cut out from all scaling images that are generated from one input image, and the process cost of the partial filter process that needs to be carried out in the discrimination process increases.

[An Embodiment of a Discrimination Device to which the Present Technology is Applied]

Figure 12:
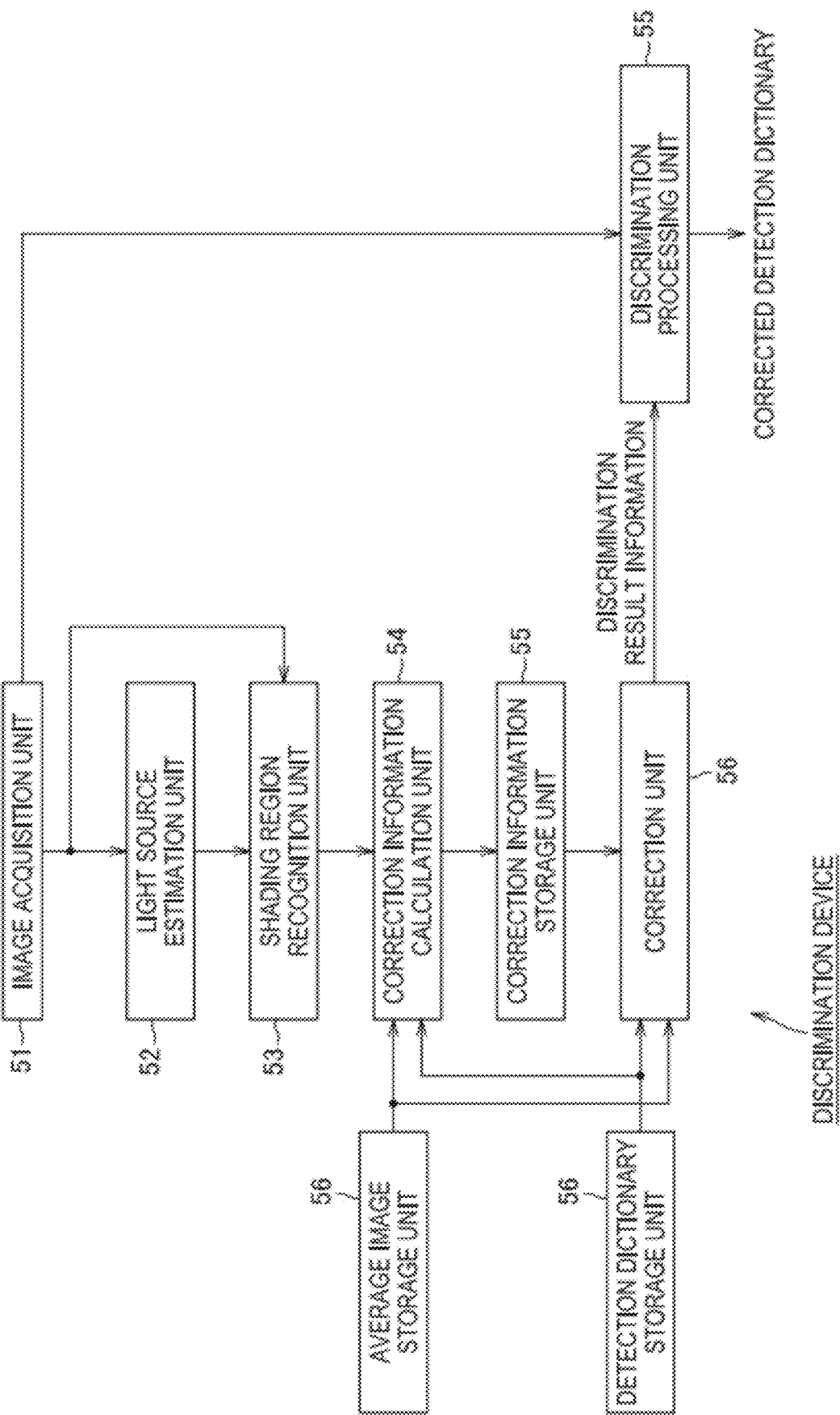
FIG. 12 is a block diagram illustrating a configuration example of an embodiment of a discrimination device to which an information processing device of the present technology is applied.

FIG. 12 is a block diagram illustrating a configuration example of an embodiment of a discrimination device to which an information processing device of the present technology is applied.

Hereinafter, in the appended drawings, portions corresponding to those in FIG. 1 are denoted with the same reference numerals, and repeated explanation of the portions is omitted.

The discrimination device of FIG. 12 has the discrimination processing unit 10 and the detection dictionary storage unit 20 in common with those of FIG. 1.

However, the discrimination device of FIG. 12 differs from that of FIG. 1 in that an image acquisition unit 51, a light source estimation unit 52, a shaded region recognition unit 53, a correction information calculation unit 54, a correction information storage unit 55, a correction unit 56, and an average image storage unit 57 are newly disposed.

In the discrimination device of FIG. 12, parameters of the ensemble learner H(x) stored in the detection dictionary storage unit 20 are corrected, so that the same effect as the case of performing the partial filter process on all window images cut out from all scaling images generated from the input image may be obtained.

The image acquisition unit 51 includes, for example, a camera, and so forth, captures an image, and supplies the captured image as an input image to the discrimination processing unit 10, the light source estimation unit 52, and the shaded region recognition unit 53.

Here, the light source estimation unit 52 to the average image storage unit 57 act as a calibration device that performs calibration of the ensemble learner H(x) as the detection dictionary stored in the detection dictionary storage unit 20.

The calibration is performed, for example, using the positive image in which the target of the human face is reflected as an input image for calibration.

The input image for calibration (hereinafter referred to as a calibration image) is supplied to the image acquisition unit 51, the light source estimation unit 52, and the shaded region recognition unit 53.

The light source estimation unit 52 estimates a light source that illuminates the target (human face) reflected in the calibration image from the calibration image, and supplies the estimated result to the shaded region storage unit 53.

The shaded region recognition unit 53 recognizes the shaded region on which shading occurs due to the light source in the calibration image from the image acquisition unit 51 based on the estimated result of the light source from the light source estimation unit 52, and supplies (information indicating) the shaded region to the correction information calculation unit 54.

That is, the shaded region recognition unit 53, for example, detects a shading boundary that is the boundary on which shading occurs due to light from the light source in the (window image cut out from the) calibration image from the image acquisition unit 51 based on the estimated result of the light source from the light source estimation unit 52.

In addition, the shaded region recognition unit 53 recognizes the region in the opposite side to the location (direction) of the light source obtained from the estimated result of the light source from the light source estimation unit 52 in two regions divided by the shading boundary in the calibration image from the image acquisition unit 51, as the shaded region on which shading occurs due to the light source, and supplies the shaded region to the correction information calculation unit 54.

The correction information calculation unit 54 calculates the correction information for correcting the parameters of the ensemble learner H(x) as the detection dictionary stored in the detection dictionary storage unit 20 using an average image stored in the average image storage unit 57 as necessary based on the estimated result from the light source estimation unit 52 and also based on the shaded region obtained in the shaded region recognition unit 53 based on the estimated result of the light source, and supplies the correction information to the correction information storage unit 55.

The correction information storage unit 55 stores the correction information from the correction information calculation unit 54.

The correction unit 56 corrects the parameters of the ensemble learner H(x) as the detection dictionary stored in the detection dictionary storage unit 20 by referring to the average image stored in the average image storage unit 57 as necessary using the correction information stored in the correction information storage unit 55, and supplies the corrected detection dictionary to the discrimination processing unit 10.

The target discrimination process of discriminating whether or not the target (human face) is reflected in the input image supplied from the image acquisition unit 51 using the corrected detection dictionary, that is, the corrected ensemble learner H(x), is then carried out in the discrimination processing unit 10 in FIG. 12.

The average image storage unit 57 stores the average image in which plural positive images, that is, the positive images (images having the correct answer label $y_i=+1$) included in the learning images used for the ensemble learning are averaged.

In addition, in the discrimination device of FIG. 12, it is possible to refer to the parameters of the ensemble learner H(x) as the detection dictionary stored in the detection dictionary storage unit 20 or the average image stored in the average image storage unit 57 in each of blocks constituting the discrimination device as necessary.

Figure 13:
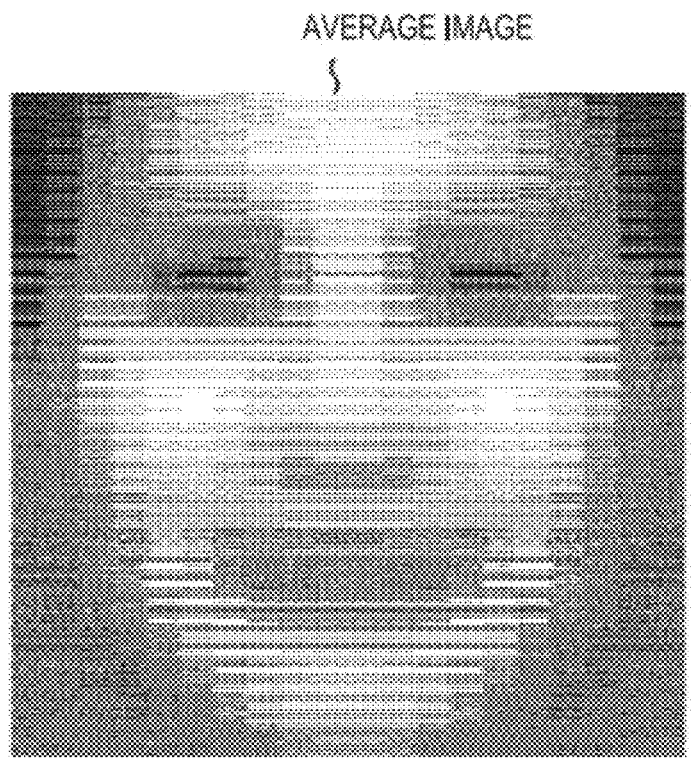
FIG. 13 is a diagram illustrating an example of an average image stored in an average image storage unit 57.

FIG. 13 is a diagram illustrating an example of the average image stored in the average image storage unit 57.

The average image is used to correct the parameters of the ensemble learner H(x) using the correction information (and calculating the correction information) as necessary.

[Principle of Present Technology]

Figure 14:
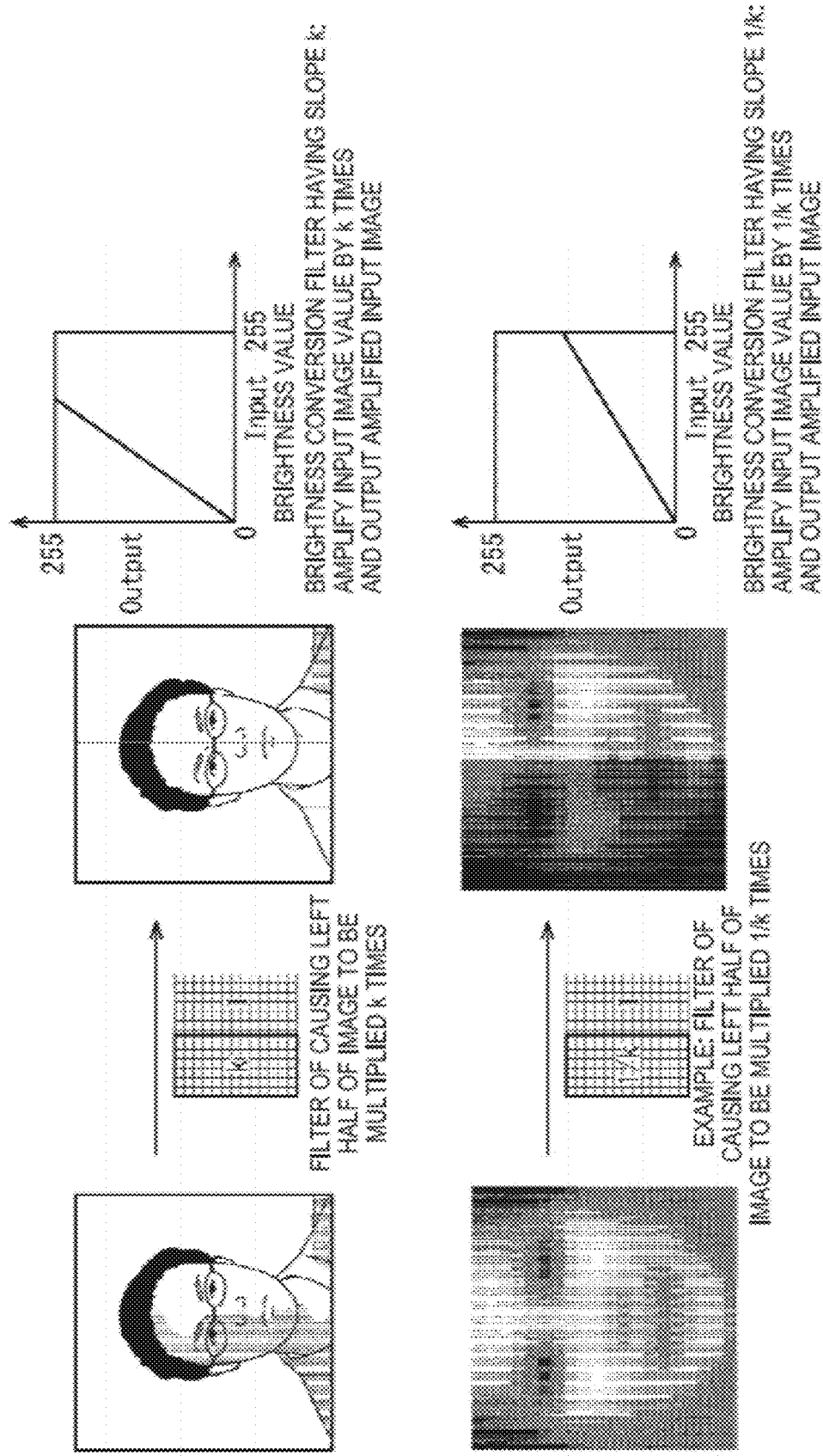
FIG. 14 is a diagram illustrating a principle of the present technology.

FIG. 14 is a diagram illustrating the principle of the present technology.

That is, FIG. 14A illustrates the window image cut out from the input image, and FIG. 14B illustrates the average image shown in FIG. 13.

In the window image of FIG. 14A, for example, when the left half is darker than the right half and is thus the shaded region, it may be necessary to perform the partial filter process of causing (pixel values of) the shaded region of the left half of the window image of FIG. 14A to be multiplied by k, so that the left half has the same brightness distribution as the right half prior to the window image discrimination process (FIG. 7) in order to prevent degradation of the discrimination performance.

However, performing the window image discrimination process using the ensemble learner H(x) on the window image subjected to the partial filter process of causing the left half to be multiplied by k as described above is equivalent to performing the window image discrimination process using the ensemble learner H(x) obtained by carrying out the ensemble learning using the image in which the left half of the learning image corresponding to the shaded region of the window image is multiplied by 1/k.

That is, for example, performing the window image discrimination process using the ensemble learner H(x) on the window image subjected to the partial filter process of causing the image value to be multiplied by k (=2) is equivalent to performing the window image discrimination process using the ensemble learner H(x) obtained by carrying out the ensemble learning using the learning image subjected to the partial filter process of causing the pixel value to be multiplied by 1/k (=½).

Accordingly, in the present technology, by correcting the parameters of the ensemble learner obtained by carrying out the ensemble learning using the learning image (hereinafter, also referred to as a standard learner) to the parameters of the ensemble learner obtained by carrying out the ensemble learning using the learning image subjected to the partial filter process of causing the pixel value to be multiplied by 1/k (hereinafter, also referred to as a filtered learner), the same effect as the case of performing the partial filter process on the window image is obtained without performing the partial filter process on the window image.

As described above, in the present technology, the parameters of the standard learner are corrected to the parameters of the filtered learner. However, the correction is carried out approximately using the average image.

That is, in the present technology, as shown in FIG. 14B, the parameters of the standard learner are corrected by performing the partial filter process of causing the pixel value to be multiplied by 1/k on the average image which is approximate to the learning image instead of the learning image and in which positive images included in the learning image are averaged, and using the average image subjected to the partial filter process as necessary.

FIG. 15 is a diagram illustrating parameter correction of the standard learner.

That is, for example, FIG. 15 is a diagram illustrating correction of parameters of the standard learner that obtains the same effect as the case of carrying out the partial filter process of causing the right half of the window image to be multiplied by k.

For example, when the partial filter process of causing the right half of the window image to be multiplied by k ($\geq 1$) is performed because the right half is a shaded region, it is possible to obtain the same effect as the partial filter process of causing the right half of the window image to be multiplied by k by performing the partial filter process of causing the right half (region corresponding to the shaded region) of the average image approximating the learning image to be multiplied by k'=1/k, which is a constant equal to or lower than 1.

Here, in the average image subjected to the partial filter process of causing the right half of the average image corresponding to the shaded region to be multiplied by k'=1/k, when any of two pixel locations $P_1$ and $P_2$ of the pixel location pair is the pixel location in the left half of the average image, the pixel values $p_1$ and $p_2$ of the pixel locations $P_1$ and $P_2$ of the average image are not changed before and after the partial filter process of causing the right half to be multiplied by k'=1/k.

The inter-pixel difference characteristic amount x of the argument x of the weak learner $h_t(x)$ in which any of two pixel locations $P_1$ and $P_2$ of the pixel location pair is the pixel location in the left half of the average image is thus not changed before and after performing the partial filter process of causing the right half to be multiplied by k'=1/k.

Operation of the weak learner $h_t(x)$ (calculation of the weak hypothesis $h_t(x)$) is performed in accordance with whether or not the threshold value th of the weak learner $h_t(x)$ and the inter-pixel difference characteristic amount x of the argument x of the weak learner satisfy x>th as described with reference to FIG. 7, and it is not necessary to correct the threshold value th that is the parameter of the ensemble learner H(x) when the inter-pixel difference characteristic amount x is not changed before and after performing the partial filter process of causing the right half to be multiplied by k'=1/k.

On the other hand, when one pixel location $P_1$ of two pixel locations $P_1$ and $P_2$ of the pixel location pair is the pixel location (region corresponding to the shaded region) in the left half of the average image and the other pixel location $P_2$ is the pixel location (region other than the region corresponding to the shaded region) in the right half, the pixel value of the pixel location $P_1$ is not changed, whereas the pixel value of the pixel location $P_2$ is changed before and after performing the partial filter process of causing the right half to be multiplied by k'=1/k.

That is, FIG. 15A illustrates the average image when the pixel location $P_1$ of two pixel locations $P_1$ and $P_2$ of the pixel location pair is the pixel location in the left half of the average image and the other pixel location $P_2$ is the pixel location in the right half.

When the pixel value of the pixel location $P_1$ is represented as $p_1$ and the pixel value of the pixel location $P_2$ is represented as $p_2$ before performing the partial filter process of causing the right half to be multiplied by k'=1/k and the pixel value of the pixel location $P_1$ is represented as $p_1'$ and the pixel value of the pixel location $P_2$ is represented as $p_2'$ after performing the partial filter process of causing the right half to be multiplied by $k'=1/k$, the pixel value $p_1'$ of the pixel location $P_1$ remains $p_1$, whereas the pixel value $p_2'$ of the pixel location $P_2$ is changed to $k'p_2$ after performing the partial filter process of causing the right half to be multiplied by $k'=1/k$.

The inter-pixel difference characteristic amount x of the argument x of the weak learner $h_t(x)$ in which one pixel location $P_1$ of two pixel locations $P_1$ and $P_2$ of the pixel location pair is the pixel location in the left half of the average image and the other pixel location $P_2$ is the pixel location in the right half is thus changed before and after performing the partial filter process.

That is, the inter-pixel difference characteristic amount x is $p_1-p_2$ before performing the partial filter process, and the inter-pixel difference characteristic amount x is $p_1'-p_2'=p_1-k'p_2$ after performing the partial filter process.

Before performing the partial filter process, operation of the weak learner $h_t(x)$ is carried out in accordance with whether or not the threshold value th of the weak learner $h_t(x)$ and the inter-pixel difference characteristic amount $x=p_1-p_2$ satisfy $x=p_1-p_2>th$.

On the other hand, since the inter-pixel difference characteristic amount is $p_1-k'p_2$ after performing the partial filter process, comparison with $p_1-p_2>th$ (i.e., whether or not $p_1-p_2>th$ is satisfied) is not performed in the same manner as before performing the partial filter process when the threshold value th of the weak learner $h_t(x)$ is used as it is.

However, when $(1-k')p_2$ is added to both sides of $p_1-p_2>th$, the inequality may be modified to $p_1-k'p_2>th+(1-k')p_2$.

In $p_1-k'p_2>th+(1-k')p_2$, the left side $p_1-k'p_2$ is equal to the inter-pixel difference characteristic amount x $(=p_1-k'p_2)$ obtained after performing the partial filter process.

Since comparison of $p_1-k'p_2>th+(1-k')p_2$ is equivalent to comparison of $p_1-p_2>th$, it is possible to perform comparison equivalent to comparison of $p_1-p_2>th$ by performing the comparison of $p_1-k'p_2>th_{new}$ using $th_{new}=th+(1-k')p_2$ as a threshold value.

Accordingly, by correcting the threshold value th of the weak learner $h_t(x)$ to the threshold value $th_{new}=th+(1-k')p_2$ and performing operation of the weak learner $h_t(x)$ using the corrected threshold value $th_{new}$ in the inter-pixel difference characteristic amount $x=p_1-k'p_2$ obtained after performing the partial filter process, it is possible to perform comparison of $p_1-k'p_2>th_{new}$ equivalent to comparison of $p_1-p_2>th$ carried out in the inter-pixel difference characteristic amount $x=p_1-p_2$ obtained before performing the partial filter process.

In addition, in the weak learner $h_t(x)$ in which one pixel location $P_1$ of two pixel locations $P_1$ and $P_2$ of the pixel location pair is the pixel location (region corresponding to the shaded region) in the right half of the average image and the other pixel location $P_2$ is the pixel location (region other than the region corresponding to the shaded region) in the left half, it is possible to perform comparison of $k'p_1-p_2>th_{new}$ equivalent to comparison of $p_1-p_2>th$ by correcting the threshold value th of the weak learner $h_t(x)$ to the threshold value $th_{new}=th-(1-k')p_1$.

FIG. 15B illustrates the average image when both pixel locations $P_1$ and $P_2$ of two pixel locations $P_1$ and $P_2$ of the pixel location pair are pixel locations in the right half (region corresponding to the shaded region).

In the same manner as in FIG. 15A, when the pixel value of the pixel location $P_1$ and the pixel value of the pixel location $P_2$ are represented as $p_1$ and $p_2$, respectively, before performing the partial filter process of causing the right half to be multiplied by $k'=1/k$ and also when the pixel value of the pixel location $P_1$ and the pixel value of the pixel location $P_2$ are represented as $p_1'$ and $p_2'$, respectively, after performing the partial filter process of causing the right half to be multiplied by $k'=1/k$, the pixel value $p_1'$ of the pixel location $P_1$ is $k'p_1$ and the pixel value $p_2'$ of the pixel location $P_2$ is $k'p_2$ after performing the partial filter process of causing the right half to be multiplied by $k'=1/k$.

The inter-pixel difference characteristic amount x of the argument x of the weak learner $h_t(x)$ in which both pixel locations $P_1$ and $P_2$ of the pixel location pair are pixel locations in the right half is thus changed before and after performing the partial filter process.

That is, the inter-pixel difference characteristic amount x is $p_1-p_2$ before performing the partial filter process, and the inter-pixel difference characteristic amount x is $p_1'-p_2'=k'p_1-k'p_2$ after performing the partial filter process.

Before performing the partial filter process, operation of the weak learner $h_t(x)$ is carried out in accordance with whether or not the threshold value th of the weak learner $h_t(x)$ and the inter-pixel difference characteristic amount $x=p_1-p_2$ satisfy $x=p_1-p_2>th$.

On the other hand, after performing the partial filter process, since the inter-pixel difference characteristic amount x is $k'p_1-k'p_2$, comparison of $p_1-p_2>th$ (i.e., whether or not $p_1-p_2>th$ is satisfied) is not carried out in the same manner as before performing the partial filter process when the threshold value th of the weak learner $h_t(x)$ is used as it is.

However, when both sides of $p_1-p_2>th$ are multiplied by $k'$, the inequality may be modified to $k'p_1-k'p_2>th \times k'$.

In $k'p_1-k'p_2>th \times k'$, the left side $k'p_1-k'p_2$ is equal to the inter-pixel difference characteristic amount x $(=k'p_1-k'p_2)$ obtained after performing the partial filter process.

Since comparison of $k'p_1-k'p_2>th \times k'$ is equivalent to comparison of $p_1-p_2>th$, it is possible to perform comparison equivalent to comparison of $p_1-p_2>th$ by performing the comparison of $k'p_1-k'p_2 th_{new}$ using $th_{new}=th \times k'$ as a threshold value.

Accordingly, in the inter-pixel difference characteristic amount $x=k'p_1-k'p_2$ obtained after performing the partial filter process, by correcting the threshold value th of the weak learner $h_t(x)$ to the threshold value $th_{new}=th \times k'$ and performing operation of the weak learner $h_t(x)$ using the corrected threshold value $th_{new}$, it is possible to perform comparison of $k'p_1-k'p_2>th_{new}$ equivalent to comparison of $p_1-p_2>th$ carried out for the inter-pixel difference characteristic amount $x=p_1-p_2$ obtained before performing the partial filter process.

In a case in which a portion of the window image is the shaded region as mentioned above, when at least one of two pixel locations $P_1$ and $P_2$ of the pixel location pair for obtaining the inter-pixel difference characteristic amount x of the argument x of the weak learner $h_t(x)$ is within the shaded region, it is possible to obtain the same effect as the case of performing the partial filter process of causing the shaded region of the window image to be multiplied by k by correcting the threshold value th of the weak learner $h_t(x)$ and performing operation of the weak learner $h_t(x)$ using the corrected threshold value $th_{new}$ as described above.

The two pixel locations $P_1$ and $P_2$ of the pixel location pair for obtaining the inter-pixel difference characteristic amount x of the argument x of the weak learner $h_t(x)$ and the threshold value th are parameters of the weak learner $h_t(x)$, and are stored in the detection dictionary storage unit 20 (FIG. 12).

In addition, the average image is stored in the average image storage unit 57.

When the shaded region on which the partial filter process is (or should be) performed and the magnification k for determining by what factor (the pixel values of) the shaded region is multiplied by virtue of the partial filter process in the window image are determined, it is possible to obtain the weak learner of which the threshold value th is (or should be) corrected in the weak learners $h_t(x)$ constituting the ensemble learner (standard learner) H(x) and the corrected threshold value $th_{new}$.

That is, it is possible to obtain the weak learner $h_t(x)$ in which at least one of two pixel locations $P_1$ and $P_2$ of the pixel location pair for obtaining the inter-pixel difference characteristic amount x is within the shaded region based on the shaded region, as the weak learner $h_t(x)$ of which the threshold value th should be corrected.

As described above, the corrected threshold value $th_{new}$ of the threshold th may thus be obtained in accordance with the equation $th_{new}=th+(1-k')p_2$ or the equation $th_{new}=th-(1-k')p_1$ in the weak learner $h_t(x)$ in which at least one of two pixel locations $P_1$ and $P_2$ of the pixel location pair is within the shaded region based on the reciprocal number $k'=1/k$ of the magnification k, and the corrected threshold value $th_{new}$ of the threshold th may be obtained in accordance with the equation $th_{new}=th\times k'$ in the weak learner $h_t(x)$ in which both of two pixel locations $P_1$ and $P_2$ of the pixel location pair are within the shaded region.

Here, since the reciprocal number $k'=1/k$ of the magnification k for determining by what factor the shaded region of the window image is multiplied by virtue of the partial filter process is a coefficient used to correct the threshold value th to the threshold value $th_{new}$, hereinafter, it is also referred to as a correction coefficient.

In the discrimination device of FIG. 12, the correction coefficient k' is determined (calculated) in the correction information calculation unit 54, and is stored along with the shaded region obtained in the shaded region recognition unit 53 in the correction information storage unit 55 as correction information.

In the correction unit 56, the ensemble learner (standard learner) stored in the detection dictionary storage unit 20 as the detection dictionary is thus corrected to the filtered learner using the correction information stored in the correction information storage unit 55.

That is, in the correction unit 56, the threshold value th of each of the weak learners $h_t(x)$ constituting the ensemble learner (standard learner) as the detection dictionary stored in the detection dictionary storage unit 20 is corrected to the threshold value $th_{new}$ as described with reference to FIG. 15.

The correction unit 56 supplies (parameters of) the filtered learner as the ensemble learner in which the threshold value th of each weak learner $h_t(x)$ is corrected to the threshold value $th_{new}$ to the discrimination processing unit 10. The discrimination processing unit 10 performs the target discrimination on the input image supplied from the image acquisition unit 51 using the filtered learner from the correction unit 56.

In addition, the correction unit 56 may read the ensemble learner (standard learner) from the detection dictionary storage unit 20, correct the ensemble learner to the filtered learner, and supply the filtered learner to the discrimination processing unit 10 whenever the input image is supplied from the image acquisition unit 51 to the discrimination processing unit 10. However, reading and correcting the ensemble learner from the detection dictionary storage unit 20 may be an impediment to a fast process whenever the input image is supplied.

The discrimination device of FIG. 12 may thus perform an initialization process, for example, right after a power source is turned on or right after the correction information is stored in the correction information storage unit 55.

In the initialization process, the correction unit reads the ensemble learner (standard learner) from the detection dictionary storage unit 20 and corrects the ensemble learner to the filtered learner, the discrimination processing unit 10 develops (parameters of) the filtered learners in a memory not shown, and it is thus possible to perform the process at a high speed using the filtered learners developed in the memory in the discrimination processing unit 10 from then on.

[Process of Light Source Estimation Unit 52]

Figure 16:
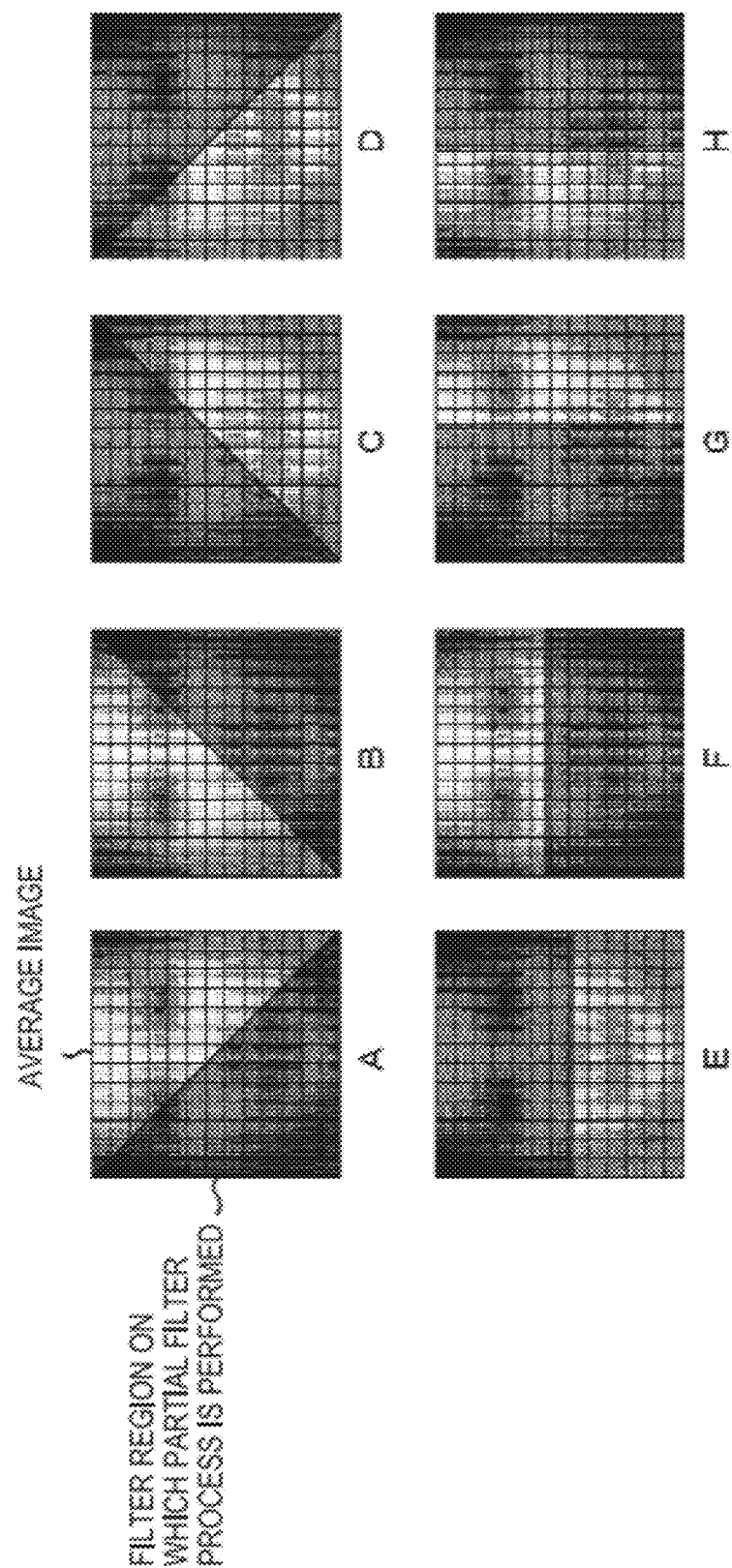
FIG. 16 is a diagram illustrating a light source estimation method of estimating a light source illuminating a target reflected in a calibration image from the calibration image by a light source estimation unit 52.

FIG. 16 is a diagram illustrating a light source estimation method of estimating a light source illuminating the target (human face) reflected in a calibration image from the calibration image by the light source estimation unit 52 of FIG. 12.

That is, FIG. 16 illustrates the region of the average image on which the partial filter process of multiplication by $k'=1/k$ is performed, that is, the region of the average image (hereinafter, also referred to as a filter region) corresponding to the shaded region occurring on the window image cut out from the input image assuming that the light source is in a certain direction (location).

FIG. 16A illustrates the filter region assuming that the light source is in the upper right direction (of the target), and the region in the lower left side among regions in the lower left side and the upper right side of the average image using a diagonal line connecting the upper left and the lower right of the rectangular average image as a boundary line is the filter region.

FIG. 16B illustrates the filter region assuming that the light source is in the upper left direction, and the region in the lower right side among regions in the lower right side and the upper left side of the average image using a diagonal line connecting the lower left and the upper right of the rectangular average image as a boundary line is the filter region.

FIG. 16C illustrates the filter region assuming that the light source is in the lower right direction, and the region in the upper left side among regions in the upper left side and the lower right side of the average image using a diagonal line connecting the lower left and the upper right of the rectangular average image as a boundary line is the filter region.

FIG. 16D illustrates the filter region assuming that the light source is in the lower left direction, and the region in the upper right side among regions in the lower left side and the upper right side of the average image using a diagonal line connecting the upper left and the lower right of the rectangular average image as a boundary line is the filter region.

FIG. 16E illustrates the filter region assuming that the light source is in the lower direction, and the region in the upper side among regions in the upper and lower sides of the average image using a line dividing the rectangular average image into two upper and lower regions as a boundary line is the filter region.

FIG. 16F illustrates the filter region assuming that the light source is in the upper direction, and the region in the lower side among regions in the upper and lower sides of the average image using a line dividing the rectangular average image into two upper and lower regions as a boundary line is the filter region.

FIG. 16G illustrates the filter region assuming that the light source is in the right direction, and the region in the left side among regions in the right and left sides of the average image using a line dividing the rectangular average image into two right and left regions as a boundary line is the filter region.

FIG. 16H illustrates the filter region assuming that the light source is in the left direction, and the region in the right side among regions in the right and left sides of the average image using a line dividing the rectangular average image into two right and left regions as a boundary line is the filter region.

The light source estimation unit 52 supposes the filter region corresponding to the shaded region occurring due to a light source assumed to be present in each of plural directions, for example, 8 directions (locations) as shown in FIG. 16A to FIG. 16H, and obtains the filtered learner of which the threshold th is corrected to the threshold $th_{new}$ as described above with reference to FIG. 15.

In addition, the light source estimation unit 52 performs the window image discrimination process (FIG. 7) on the window image (hereinafter, also referred to as a window image for calibration) of which a portion in which the target is reflected is cut out from the calibration image from the image acquisition unit 51 using the filter identifier obtained in the light source assumed to be present in each direction.

In addition, calculation of the filtered learner (correction of the threshold value th to the threshold value $th_{new}$) and the window image discrimination process using the filtered learner are performed on the plural correction coefficients k' in which the correction coefficient k'=1/k is changed per 0.1 notch in a range equal to or less than 1.0, for example, in a range of 0.1 to 1.0 in the light source estimation unit 52.

The light source estimation unit 52 thus estimates that the light source is in the direction of the light source assumed so as to obtain the filtered learner discriminated such that the window image for calibration is a positive image.

Here, when there are plural filtered learners discriminated such that the window image for calibration is the positive image, it is possible to estimate that the light source is in the direction of the light source assumed so as to obtain the filtered learner having the highest integrated value $\Sigma(\alpha_t \times h_t(x))$ among integrated values (indicating the weight of the reliability $\alpha_t$ of) (the weak hypotheses $h_t(x)$) of the evaluation values s obtained in the window image discrimination process, for example, as the score indicating the plausibility that the target is present.

Figure 17:
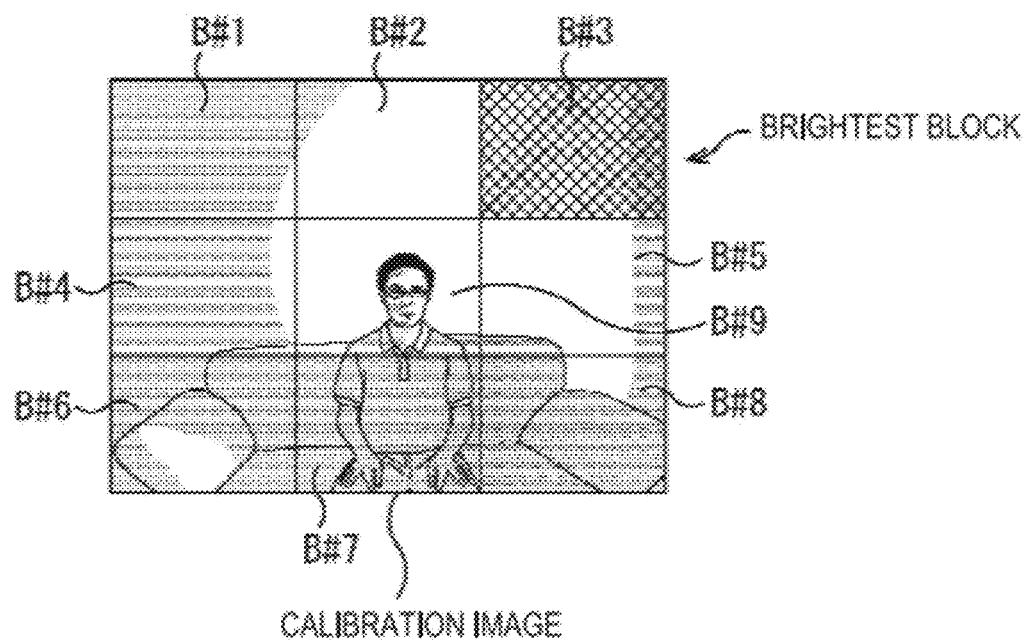
FIG. 17 is a diagram illustrating another light source estimation method of estimating a light source by a light source estimation unit 52.

FIG. 17 is a diagram illustrating another light source estimation method of estimating the light source with the light source estimation unit 52 of FIG. 12.

FIG. 17 illustrates the calibration image supplied to the light source estimation unit 52 from the image acquisition unit 51.

The light source estimation unit 52, for example, divides the calibration image into 9 blocks B#1, B#2, B#3, B#4, B#5, B#6, B#7, B#8, and B#9 by equally dividing each of horizontal and vertical portions into 3 regions as shown in FIG. 17.

In addition, the light source estimation unit 52, for example, obtains the histogram of each of the blocks B#1 to B#8 in the peripheral side (image frame side) of the input image and detects, for example, the block of which the brightness (pixel value) having the most frequent value (the largest frequency) is the highest among the blocks B#1 to B#8 as the brightest block.

The light source estimation unit 52 thus estimates that the light source is in the direction in which the brightest block is present when seen from the center (block #9) of the calibration image.

That is, the light source estimation unit 52 estimates that the light source is in the upper left direction when the brightest block is the block B#1, in the upper direction when the brightest block is the block B#2, in the upper right direction when the brightest block is the block B#3, in the left direction when the brightest block is the block B#4, in the right direction when the brightest block is the block B#5, in the lower left direction when the brightest block is the block B#6, in the lower direction when the brightest block is the block B#7, and in the lower right direction when the brightest block is the block B#8.

In addition, the method of estimating the light source in the light source estimation unit 52 is not limited to those described with reference to FIGS. 16 and 17.

That is, an inverse problem of estimating the light source distribution from the image is referred to as inverse lighting (or rendering), and usually has three approaches such as an approach based on a specular reflection component observed on an object surface, an approach based on a diffused reflection component, and an approach using a shadow casting a certain object over another object (casting shadow), and these approaches may be employed as the method of estimating the light source in the light source estimation unit 52.

In addition, for example, when the target is a known object, the light source estimation unit 52 may estimate the direction of the light source in further detail using the fact that the target is the known object after estimating the direction of the light source in the method of estimating the light source as described with reference to FIG. 16.

The method of estimating the light source using the light source estimation method 52 is not particularly limited. However, it is preferable that the detailed direction of the light source be estimated in terms of prevention of degradation of the discrimination performance of discriminating the target.

[Process of Shaded Region Recognition Unit 53]

Figure 18:
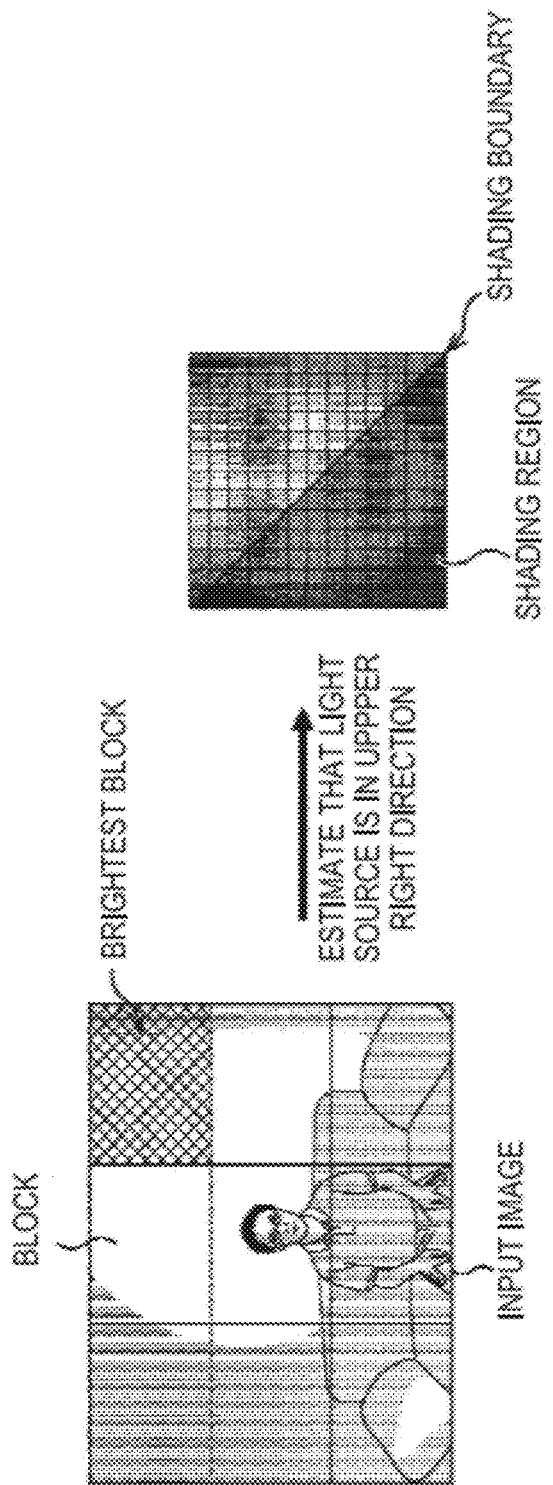
FIG. 18 is a diagram illustrating a boundary detection method of detecting a shading boundary on which shading occurs due to light from a light source in a calibration image by a shaded region recognition unit 53.

FIG. 18 is a diagram illustrating a boundary detection method of detecting the shading boundary on which shading occurs due to light from a light source in a calibration image by the shaded region recognition unit 53 of FIG. 12.

The shaded region recognition unit 53 detects the shading boundary on the window image for calibration among calibration images based on the estimated result of the light source from the light source estimation unit 52.

That is, in the light source estimation unit 52, for example, when (the direction of) the light source is estimated and the estimated result of the light source indicates that the light source is in the upper right direction as described above with reference to FIG. 17, the shaded region recognition unit 53 detects the diagonal line connecting the upper left and the lower right of the rectangular window image for calibration as the shading boundary as shown in FIG. 18. The shaded region recognition unit 53 thus recognizes the region in the lower left side on the opposite side to the light source among the region in the lower left side and the region in the upper right side of the window image for calibration divided by the shading boundary as the shaded region.

Similarly, when the estimated result of the light source indicates that the light source is in the upper left direction, the shaded region recognition unit 53 detects the diagonal line connecting the lower left and the upper right of the rectangular window image for calibration as the shading boundary. The shaded region recognition unit 53 thus recognizes the region in the lower right side on the opposite side to the light source among the region in the upper left side and the region in the lower right side of the window image for calibration divided by the shading boundary as the shaded region.

When the estimated result of the light source indicates that the light source is in the lower right direction, the shaded region recognition unit 53 detects the diagonal line connecting the lower left and the upper right of the rectangular window image for calibration as the shading boundary. The shaded region recognition unit 53 thus recognizes the region in the upper left side on the opposite side to the light source among the region in the upper left side and the region in the lower right side of the window image for calibration divided by the shading boundary as the shaded region.

When the estimated result of the light source indicates that the light source is in the lower left direction, the shaded region recognition unit 53 detects the diagonal line connecting the upper left and the lower right of the rectangular window image for calibration as the shading boundary. The shaded region recognition unit 53 thus recognizes the region in the upper right side on the opposite side to the light source among the region in the lower left side and the region in the upper right side of the window image for calibration divided by the shading boundary as the shaded region.

When the estimated result of the light source indicates that the light source is in the lower direction, the shaded region recognition unit 53 detects the diagonal line equally dividing the rectangular window image for calibration into two upper and lower portions as the shading boundary. The shaded region recognition unit 53 thus recognizes the region in the upper side on the opposite side to the light source among the region in the upper side and the region in the lower side of the window image for calibration divided by the shading boundary as the shaded region.

When the estimated result of the light source indicates that the light source is in the upper direction, the shaded region recognition unit 53 detects the diagonal line equally dividing the rectangular window image for calibration into two upper and lower portions as the shading boundary. The shaded region recognition unit 53 thus recognizes the region in the lower side on the opposite side to the light source among the region in the upper side and the region in the lower side of the window image for calibration divided by the shading boundary as the shaded region.

When the estimated result of the light source indicates that the light source is in the left direction, the shaded region recognition unit 53 detects the diagonal line equally dividing the rectangular window image for calibration into two right and left portions as the shading boundary. The shaded region recognition unit 53 thus recognizes the region in the right side on the opposite side to the light source among the region in the right side and the region in the left side of the window image for calibration divided by the shading boundary as the shaded region.

When the estimated result of the light source indicates that the light source is in the right direction, the shaded region recognition unit 53 detects the diagonal line equally dividing the rectangular window image for calibration into two right and left portions as the shading boundary. The shaded region recognition unit 53 thus recognizes the region in the left side on the opposite side to the light source among the region in the right side and the region in the left side of the window image for calibration divided by the shading boundary as the shaded region.

In addition, the boundary detection method of detecting the shading boundary (and the recognition method of recognizing the shaded region) in the shaded region recognition unit 53 is not limited to the method described with reference to FIG. 18.

That is, for example, when (the direction of) the light source is estimated in the light source estimation unit 52 as described above with reference to FIG. 16, the shaded region recognition unit 53 detects the boundary of the filter region of FIG. 16 when it is assumed that the light source is in the direction indicated by the estimated result of the light source as the shading boundary, and recognizes the filter region as the shaded region.

Figure 19:
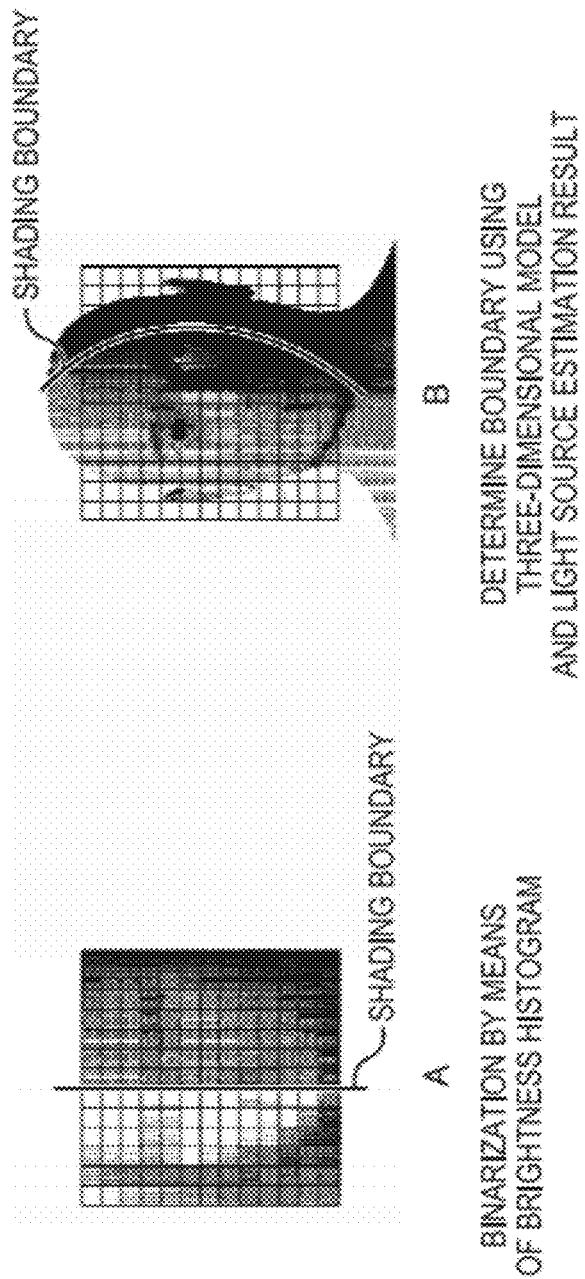
FIG. 19 is a diagram illustrating another boundary detection method.

FIG. 19 is a diagram illustrating another boundary detection method.

FIG. 19A is a diagram illustrating the boundary detection method of detecting the shading boundary using a binarized image of which the pixel value of the window image for calibration is binarized to 0 or 1.

In FIG. 19A, in the shaded region recognition unit 53, the histogram of the pixel values of the window image for calibration is obtained, and the threshold value for binarization that is used for the binarization is obtained based on the histogram, for example, such that the number of pixels of which the pixel value is binarized to 0 is (almost) equal to the number of pixels of which the pixel value is binarized to 1.

In addition, the shaded region recognition unit 53 binarizes the pixel values of the window image for calibration by the threshold value process using the binarization threshold value, thereby obtaining the binarized image.

The shaded region recognition unit 53 thus divides the binarized image into a region in which pixels having the pixel value of 1 are larger and a region in which pixels having the pixel value of 0 are larger, and, for example, detects the linear boundary line perpendicular to the direction of the light source indicated by the estimated result of the light source as the shading boundary.

In this case, it is also possible to recognize the region in which the pixels having the pixel value of 0 are larger in the binarized image as the shaded region.

FIG. 19B is a diagram illustrating the boundary detection method of detecting the shading boundary using a three-dimensional model.

When the light source estimation unit 52 may obtain the three-dimensional location relation between the light source and the target as the estimated result of the light source, the shaded region recognition unit 53 may perform the simulation on how to illuminate the three-dimensional model of the target by virtue of light from the light source based on the three-dimensional location relation between the light source and the target using the three-dimensional model of the target reflected in the window image for calibration.

The shaded region recognition unit 53 thus divides the window image for calibration into bright and dark regions based on the simulation result, and detects the shading boundary that is a linear or nonlinear boundary.

In this case, the dark region of the window image for calibration is recognized as the shaded region.

[Process of Correction Information Calculation Unit 54]

Figure 20:
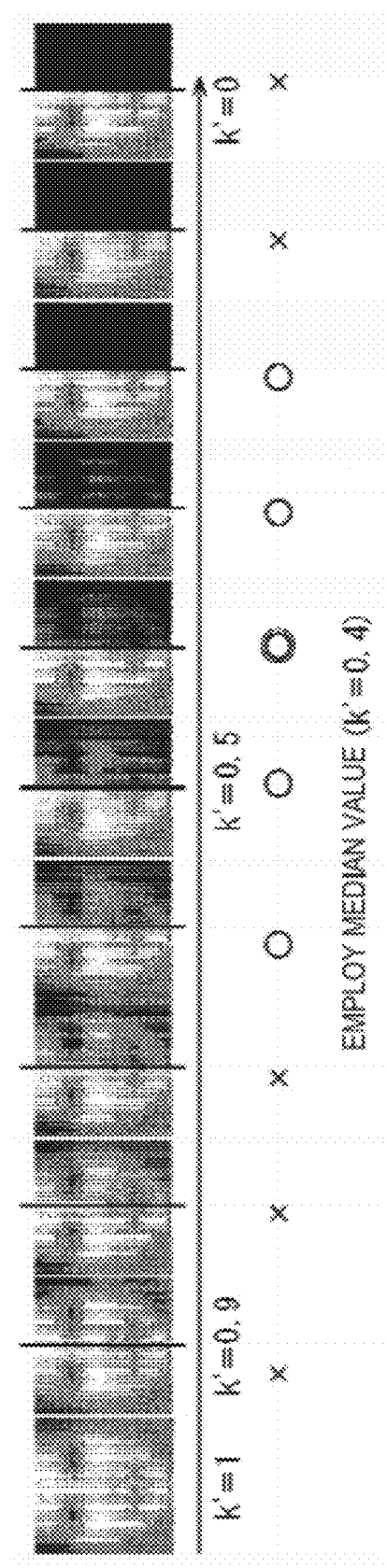
FIG. 20 is a diagram illustrating a method of determining (calculating) a correction coefficient k' by a correction information calculation unit 54.

FIG. 20 is a diagram illustrating a method of determining (calculating) a correction coefficient k' by the correction information calculation unit 54 of FIG. 12.

The proper correction coefficient k' for more strictly preventing degradation of the discrimination performance of discriminating the target varies depending on environmental conditions such as intensity, distance, direction and so forth of the light source. For example, the correction information calculation unit 54 determines the proper correction coefficient k' as follows.

That is, the correction information calculation unit 54 obtains the weak learner $h_t(x)$ of which at least one between two pixel locations $P_1$ and $P_2$ of the pixel location pair for obtaining the inter-pixel difference characteristic amount x is within the shaded region as described above with reference to FIG. 15 based on the shaded region from the shaded region recognition unit 53, as the weak learner $h_t(x)$ of which the threshold th should be corrected (hereinafter, also referred to as a weak learner for correction).

In addition, the correction information calculation unit 54 performs correction of the threshold value th of the weak learner for correction $h_t(x)$, for example, using candidates of plural correction coefficients k' that are changed per 0.1 notch in a range of 0.1 to 1.0, and obtains the filtered learner as the ensemble learner of which the threshold value th of the weak learner for correction $h_t(x)$ is corrected in each of the candidates of the plural correction coefficients k'.

In addition, the correction information calculation unit 54 performs the window image discrimination process on the window image for calibration supplied through the shaded region recognition unit 53 from the image acquisition unit 51 using the filtered learner obtained in each of the candidates of the plural correction coefficients k'.

The correction information calculation unit 54 then determines the candidate of the correction coefficient k' used to obtain the filtered learner discriminated such that the window image for calibration is the positive image as a result of the window image discrimination process as the correction coefficient k'.

Here, when the number of the filtered learner discriminated such that the window image for calibration is the positive image is equal to or higher than 2, for example, a median value (median) among the candidates of the correction coefficients k' used to obtain the at least two filtered learners may be determined as the correction coefficient k'.

In FIG. 20, when the filtered learner of which the threshold value th of the weak learner for correction $h_r(x)$ is corrected by each of the candidates of 5 correction coefficients k' such as 0.2, 0.3, 0.4, 0.5, and 0.6 is used, it is discriminated that the window image for calibration is the positive image, and the median value of 0.4 among the candidates of 5 correction coefficients k' is thus determined as the correction coefficient k'.

In addition, when the number of the filtered learner discriminated such that the window image for calibration is the positive image is equal to or higher than 2, rather than the median value among the candidates of the correction coefficients k' used to obtain the at least two filtered learners, for example, the candidate of the correction coefficient k' used to obtain the filtered learner having the highest evaluation value s obtained in the window image discrimination process as a score indicating the plausibility that the target is present may be determined as the correction coefficient k'.

[Method of Acquiring Calibration Image]

Figure 21:
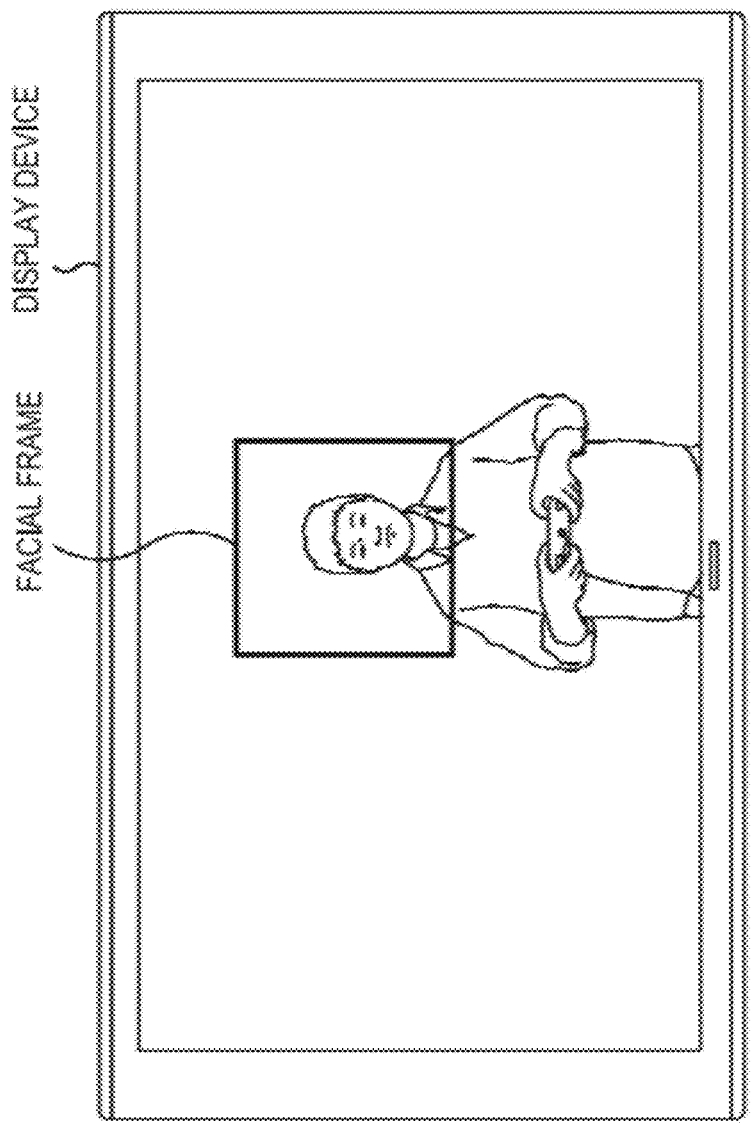
FIG. 21 is a diagram illustrating an acquisition method of acquiring a calibration image in an image acquisition unit 51.

FIG. 21 is a diagram illustrating the acquisition method of acquiring the calibration image in the image acquisition unit 51 of FIG. 12.

The image acquisition unit 51 displays the image captured in the camera along with the facial frame in which the target of the human face is displayed on a display device such as a TV (television set) as shown in FIG. 21, and prompts the user to display the face within the facial frame, for example, for a predetermined time.

The image acquisition unit 51 thus displays the face within the facial frame and acquires the image captured in the camera as the calibration image. In addition, for example, the image within the facial frame among the calibration images is used as the window image for calibration.

As described above, the image acquisition unit 51 prompts the user to display the face within the facial frame and acquires the image of which the face is displayed within the facial frame as the calibration image, so that it is possible to determine the proper correction coefficient k'.

Here, the discrimination device of FIG. 12 may be applied to, for example, the TV or personal computer (PC) having a function of switching an operation mode between a common mode and an electric power saving mode in accordance with the presence and absence of the human, a game apparatus performing various processes in accordance with the location of the human on the image captured in the camera, and so forth.

In the TV to which the discrimination device of FIG. 12 is applied, the calibration image may be acquired, for example, when initialization such as a channel scan or the like is performed. In addition, in the game apparatus or PC to which the discrimination device of FIG. 12 is applied, the calibration image may be acquired when initial setting on the game or PC is performed.

[Calibration Process]

Figure 22:
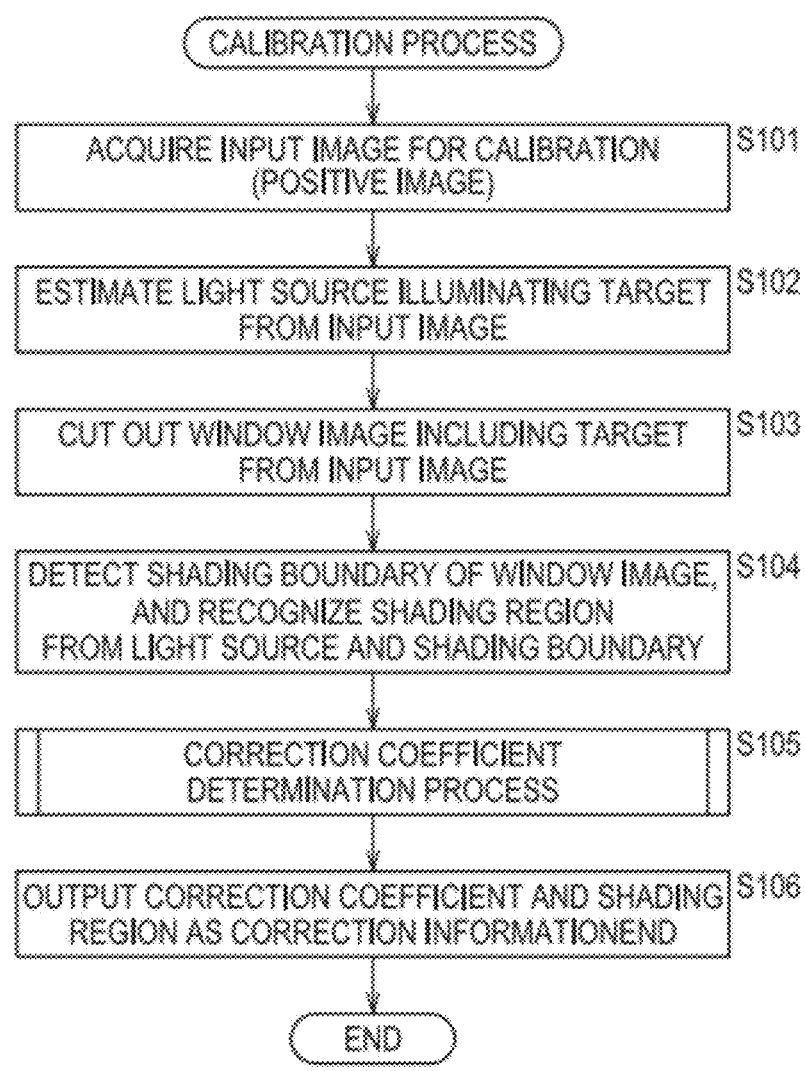
FIG. 22 is a flow chart illustrating a calibration process.

FIG. 22 is a flow chart illustrating the calibration process of the ensemble learner H(x) as the detection dictionary stored in the detection dictionary storage unit 20 that is carried out by the discrimination device of FIG. 12.

In step S101, the image acquisition unit 51, for example, acquires the positive image that is the calibration image (input image for calibration) and supplies the positive image to the light source estimation unit 52 and the shaded region recognition unit 53 as described above with reference to FIG. 21, and the process proceeds to step S102.

In step S102, the light source estimation unit 52 estimates the light source illuminating the target (the human face) reflected in the calibration image from the calibration image from the image acquisition unit 51 and supplies the estimated result to the shaded region recognition unit 53, and the process proceeds to step S103.

In step S103, the shaded region recognition unit 53 cuts out a portion of the facial frame of FIG. 21 from (the scaling image to which the calibration image is scaled as necessary) the calibration image from the image acquisition unit 51, or the window image for calibration that is the window image in which the target (human face) is reflected, and the process proceeds to step S104.

In step S104, the shaded region recognition unit 53 detects the shading boundary on which shading occurs due to light from the light source in the window image for calibration, for example, based on the estimated result of the light source from the light source estimation unit 52.

In addition, the shaded region recognition unit 53 recognizes the region on the opposite side to the location (direction) of the light source obtained from the estimated result from the light source estimation unit 52 among two regions divided by the shading boundary in the window image for calibration as the shaded region on which shading occurs due to the light source and supplies the region to the correction information calculation unit 54, and the process proceeds to step S105.

In step S105, the correction information calculation unit 54 performs a correction coefficient determination process of determining the correction coefficient k'=1/k for correcting the threshold value th of the weak learner $h_r(x)$ as the parameter of the ensemble learner H(x) that is the detection dictionary stored in the detection dictionary storage unit 20 to the threshold value $th_{new}$ using the average image stored in the average image storage unit 57 based on the shaded region from the shaded region recognition unit 53 as necessary, and the process proceeds to step S106.

In step S106, the correction information calculation unit 54 outputs the correction coefficient k' obtained in the correction coefficient determination process along with the shaded region from the shaded region recognition unit 53 to the correction information storage unit 55 as the correction information, and causes the correction information storage unit to store the correction information, and the calibration process is thus finished.

Figure 23:
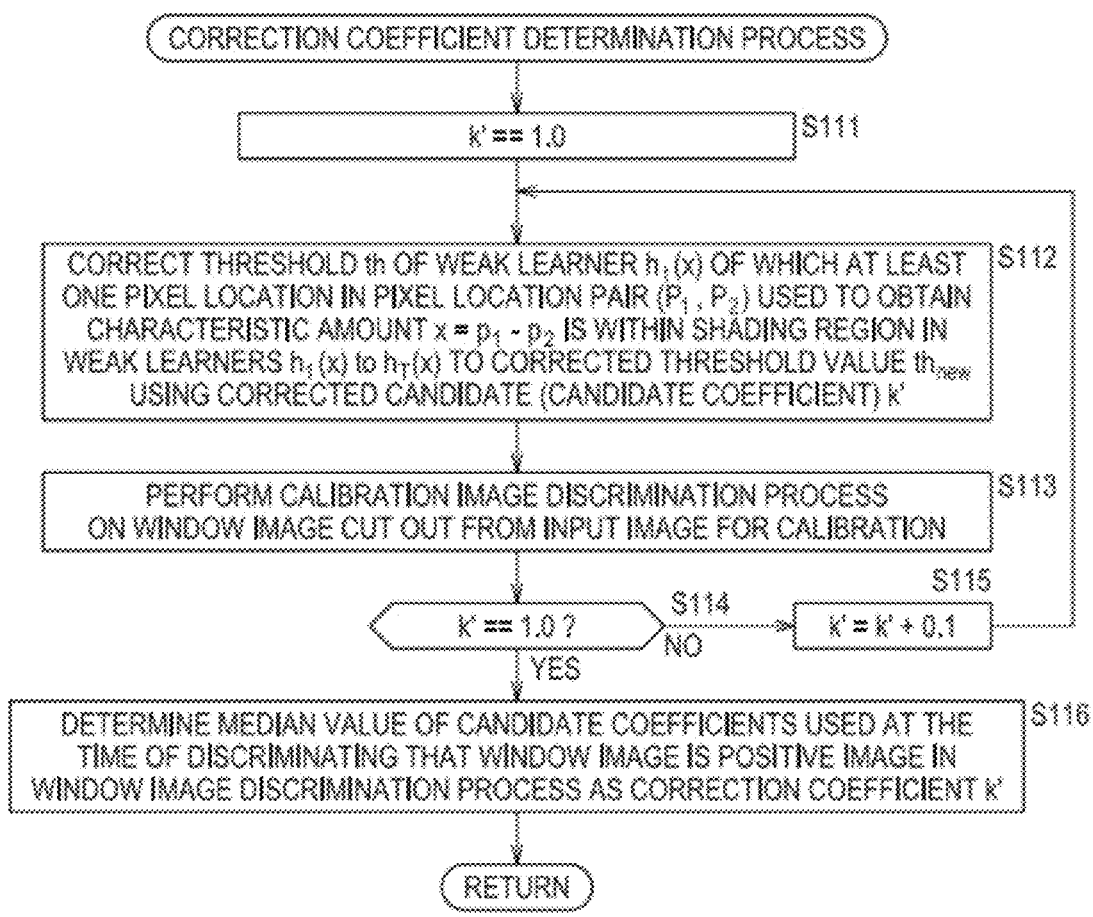
FIG. 23 is a flow chart illustrating a correction coefficient determination process carried out by a correction information calculation unit 54.

FIG. 23 is a flow chart illustrating the correction coefficient determination process carried out by the correction information calculation unit 54 (FIG. 12) in step S105 of FIG. 22.

In step S111, the correction information calculation unit 54 sets the variable k' indicating the candidate coefficient that is the candidate of the correction coefficient, for example, to 0.1 as an initial value, and the process proceeds to step S112.

In step S112, the correction information calculation unit 54 obtains the weak learner $h_t(x)$ of which at least one between two pixel locations $P_1$ and $P_2$ of the pixel location pair for obtaining the inter-pixel difference characteristic amount x is within the shaded region as the weak learner of which the threshold value th should be corrected $h_t(x)$ (weak learner for correction) based on the shaded region from the shaded region recognition unit 53 as described above with reference to FIG. 15.

In addition, in step S112, the correction information calculation unit 54 obtains the filtered learner that is the ensemble learner of which the threshold value th is corrected to the threshold value (corrected threshold value) $th_{new}$ by performing correction of the threshold value th of the weak learner for correction $h_t(x)$ using the candidate coefficient k' as the correction coefficient and also using the average image stored in the average image storage unit 57 as necessary as described above with reference to FIG. 15, and the process proceeds to step S113.

In step S113, the correction information calculation unit 54 performs the window image discrimination process (FIG. 7) on the window image for calibration obtained in step S103 of FIG. 22 in the shaded region recognition unit using the filtered learner obtained in the immediately previous step S112, and the process proceeds to step S114.

In step S114, the correction information calculation unit 54 determines whether or not the candidate coefficient k' is equal to 1.0.

When it is determined that the candidate coefficient k' is not equal to 1.0 in step S114, that is, when the candidate coefficient k' is still less than 1.0, the process proceeds to step S115, and the correction information calculation unit 54 increments the candidate coefficient k' by a predetermined value, for example, 0.1.

The process then returns to step S112 from step S115, and the same processes are repeatedly carried out from then on.

In addition, when it is determined that the candidate coefficient k' is equal to 1.0 in step S114, that is, when the threshold value th of the weak learner $h_t(x)$ for correction is corrected using plural candidate coefficients k' changed per 0.1 notch in a range of 0.1 to 1.0 and the window image discrimination process is carried out using the filtered learner that is the ensemble learner of which the threshold value th of the weak learner for correction is corrected in each of the candidate coefficients k', the process proceeds to step S116, and the correction information calculation unit 54 determines, for example, the median value among at least one candidate coefficient k' used for obtaining at least one filtered learner discriminated such that the window image for calibration is a positive image as a result of the window image discrimination process as the correction coefficient k', and the process returns to step S106 (of FIG. 22).

[Discrimination Process]

Figure 24:
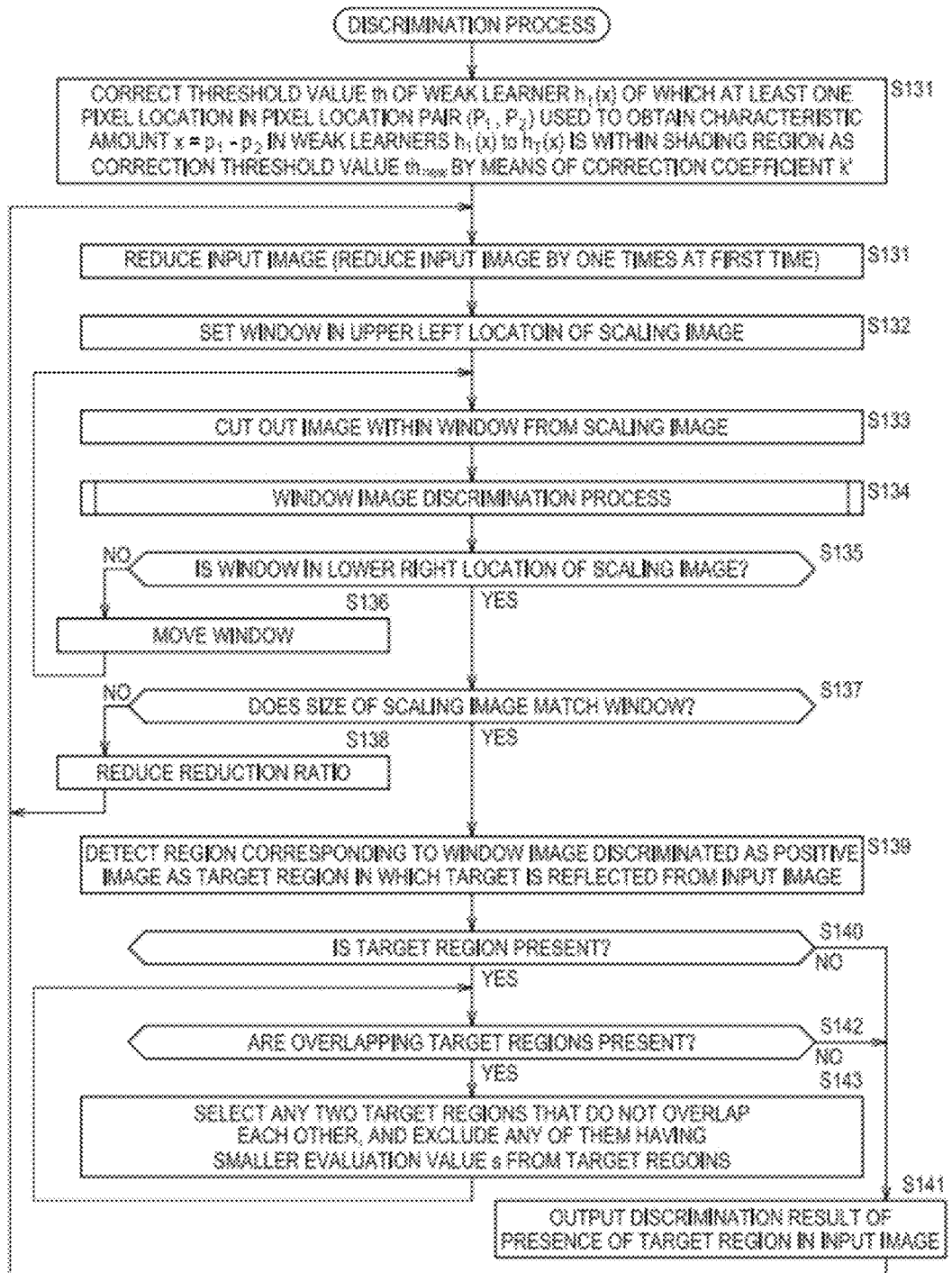
FIG. 24 is a flow chart illustrating a discrimination process carried out by a discrimination device.

FIG. 24 is a flow chart illustrating the discrimination process carried out by the discrimination device of FIG. 12.

In step S130, the correction unit 56 reads the correction information stored in the correction information storage unit 55, and obtains the weak learner $h_t(x)$ of which at least one between two pixel locations $P_1$ and $P_2$ of the pixel location pair for obtaining the inter-pixel difference characteristic amount x is within the shaded region as the weak learner (weak learner for correction) $h_t(x)$ of which the threshold value th should be corrected based on the shaded region of the correction information as described above with reference to FIG. 15.

In addition, in step S130, the correction unit 56 corrects the threshold value th of the weak learner $h_t(x)$ using the correction coefficient k' of the correction information and also using the average image stored in the average image storage unit 57 as necessary, obtains the filtered learner as the ensemble learner of which the threshold value th is corrected to the threshold value $th_{new}$ (corrected threshold value), and supplies the filtered learner to the discrimination unit 13 (FIG. 1) of the discrimination processing unit 10 as described above with reference to FIG. 15.

The process then proceeds to step S131 from step S130, and the same processes as those in step S51 to step S63 of FIG. 6 are carried out in step S131 to step S143, respectively.

However, in the window image discrimination process of step S134 of FIG. 24 corresponding to step S54 of FIG. 6, the filtered learner supplied to the (discrimination unit 13 of the) discrimination processing unit 10 from the correction unit 56 instead of the ensemble learner (standard learner) as the detection dictionary stored in the detection dictionary storage unit 20 is used.

Accordingly, in the discrimination unit of FIG. 12, the correction unit 56 corrects the parameter of the ensemble learner using the correction information calculated based on the light source illuminating the target, the discrimination processing unit 10 integrates the weak hypotheses output from the weak learners with respect to the inter-pixel difference characteristic amount using the corrected ensemble learners of the parameters (filtered learners) and discriminates whether or not the target is reflected in the input image based on the integrated value of the weak hypotheses, and it is thus possible to easily prevent degradation of the discrimination performance of discriminating whether or not a predetermined target is reflected in the input image.

That is, for example, when the input image is the biasedly shaded image of which the right side of the human face is bright and the left side is shaded as shown in FIG. 8B, it is possible to prevent degradation of the discrimination performance by partially applying the brightness conversion filter causing the pixel value p to be multiplied by k (>1) only to the portion in the left side on which shading occurs in the window image cut out from the input image.

However, when the brightness conversion filter is partially applied to the window image as described above with reference to FIG. 11, it may be necessary to perform the partial filter process of partially applying the brightness conversion filter to the window image before the window image discrimination process (FIG. 7) is carried out after the input image is scaled and the window image is then cut out from the scaling image.

It may thus be necessary to perform the partial filter process on all window images cut out from all scaling images generated from the input image in one input image, thereby increasing the process cost of the partial filter process on which the discrimination process may be performed.

On the other hand, the discrimination device of FIG. 12 may correct the threshold value th of the weak learner $h_t(x)$ as the parameter of the ensemble learner (standard learner) H(x) stored in the detection dictionary storage unit 20 to obtain the same effect as the case of applying the partial filter process to all window images cut out from all scaling images generated from the input image, and the process cost increasing in the discrimination process is applied only to the portion for obtaining the filtered learner in step S13 of FIG. 24.

Degradation of the discrimination performance can thus be easily prevented while hardly increasing the process cost, and robust target discrimination can be performed on the environment of the light source.

In addition, the process time necessary for the discrimination device of FIG. 12 to perform the discrimination process (FIG. 24) is hardly different from the process time necessary for the discrimination device of FIG. 1 to perform the discrimination process (FIG. 6).

In addition, in the present embodiment, correction of the threshold value th of the weak learner $h_t(x)$ corresponding to the partial filter process of partially applying the brightness conversion filter amplifying the pixel value by a constant value k'=1/k to the average image is carried out. However, aside from that, for example, correction of the threshold value th of the weak learner $h_t(x)$ corresponding to the entire filter process of applying the brightness conversion filter amplifying the pixel value by a different magnification k' according to the pixel location to the entire average image may be carried out.

Figure 25:
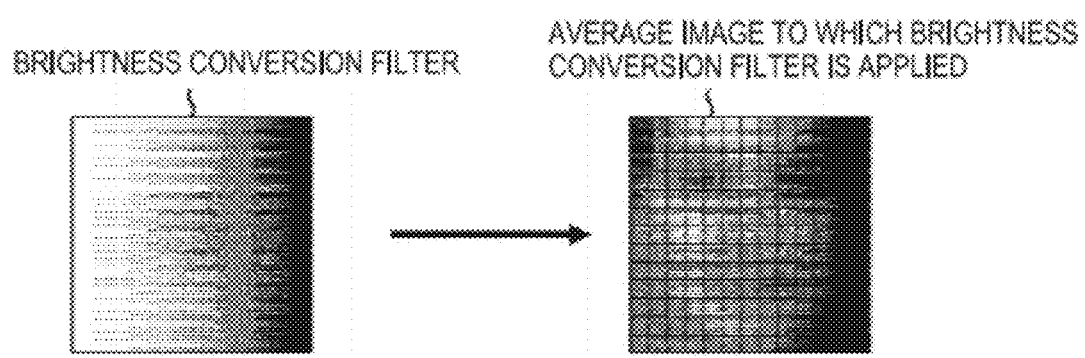
FIG. 25 is a diagram illustrating a brightness conversion filter carrying out amplification with a different magnification k' in accordance with a pixel location, and an average image to which the brightness conversion filter is applied.

FIG. 25 is a diagram illustrating the brightness conversion filter that performs amplification with a different magnification k' in accordance with a pixel location, and an average image to which the brightness conversion filter is applied.

In FIG. 25, in the brightness conversion filter, the magnification k'=1/k is linearly changed from 1.0 to 0.0 (minute value approximate to 0) while the pixel location is moved from the left end to the right end, that is, gradient is applied to the magnification k'.

When the window image is converted to the properly illuminated image by applying the brightness conversion filter performing amplification with the linearly increasing magnification k to the entire window image while the pixel location is moved from the left end to the right end, it is possible to prevent the discrimination performance of discriminating the target from being degraded due to the light source by performing correction of the threshold value th of the weak learner $h_t(x)$ corresponding to the entire filter process of applying the brightness conversion filter of which the gradient is applied to the magnification k' to the entire average image shown in FIG. 25.

In addition, the discrimination process of FIG. 24 of obtaining the filtered learner and discriminating the target may be performed not only on the input image of a still image but also of a moving image. When the environment of the light source is hardly changed, the discrimination process of FIG. 24 for the moving image partially applies the brightness conversion filter to the window image, so that target discrimination can be performed at a high speed without causing the discrimination performance to affect the light source in comparison with a case of carrying out the discrimination process of FIG. 6.

Here, when the discrimination device of FIG. 12 is applied to, for example, devices of which the use location is fixed such as a stationary game device, a TV, a PC, and so forth, the calibration process (FIG. 22) may be carried out at a plurality of different times, and the correction information storage unit 55 (FIG. 12) may store the time when the calibration process is carried out and the correction information obtained by the calibration process in a corresponding manner.

In this case, correction (step S130 of FIG. 24) of the threshold value th of the weak learner $h_t(x)$ in the discrimination process (FIG. 24) may be carried out, for example, using the correction information correspondingly associated with the time nearest to the current time (time at which the discrimination process is carried out) in the correction information stored in the correction information storage unit 55.

As mentioned above, by performing the correction of the threshold value th of the weak learner $h_t(x)$ using the correction information correspondingly associated with the time nearest to the current time, it is possible to prevent degradation of the discrimination performance, for example, even when the environment of the light source is changed due to time zones.

In addition, the estimation information indicating the estimated result of the light source when the calibration process is carried out and the correction information obtained by the calibration process may be stored in the correction information storage unit 55 (FIG. 12) in a corresponding manner.

When a plurality of sets of the estimation information and the correction information are stored in the correction information storage unit 55, the threshold value th of the weak learner $h_t(x)$ may be corrected by estimating the light source in the light source estimation unit 52 and using the correction information of which the latest estimation information is correspondingly associated with the estimated result of the light source when the discrimination process (FIG. 24) is performed.

In addition, it is implicitly assumed that the light source is present only in a certain direction at the time of estimating the light source in the light source estimation unit 52 (FIG. 12) in the present embodiment. However, aside from this assumption, estimation by the light source estimation method capable of estimating the light source in further detail may be performed and the correction information may be obtained based on the estimated result of the light source considering that the light source may be present in each of plural directions.

In addition, the threshold value th of the weak learner $h_t(x)$ may be corrected using different correction information in accordance with the location of the window image cut out from the input image that is the target of the window image discrimination process (FIG. 7) in the discrimination process (FIG. 24).

That is, the calibration process may include sequentially displaying the facial frames described with reference to FIG. 21, for example, in plural locations corresponding to centers of the respective blocks B#1 to B#9 shown in FIG. 17 of the input image as the calibration image, obtaining the correction information using the window image for calibration in which the face displayed in the facial frame of the location corresponding to the center of each of the blocks B#1 to B#9 is reflected, and storing the correction information in the correction information storage unit 55.

The discrimination process (FIG. 24) then may correct the threshold th of the weak learner $h_t(x)$ to the correction threshold value $th_{new}$ using the correction information stored in the correction information storage unit 55 in each of the blocks, and may perform the window image discrimination process (FIG. 7), for example, using the correction threshold value $th_{new}$ in the block having the largest area occupied by the window image among correction threshold values $th_{new}$ in the respective blocks B#1 to B#9.

[Description of Computer to which Present Technology is Applied]

The series of processes described above may be carried out by hardware or may be carried out by software. When the series of processes are carried out by the software, a program constituting the software is installed on a general-purpose computer or the like.

FIG. 26 illustrates a configuration example of an embodiment of a computer on which the program carrying out the series of processes described above is installed.

The program may be recorded in advance on a hard disk 105 or read only memory (ROM) 103 as a recording medium built in the computer.

Alternatively, the program may be stored (recorded) in a removable recording medium 111. The removable recording medium 111 may be provided as so-called package software. Here, the removable recording medium 111 includes, for example, a flexible disk, a compact disc (CD)-ROM, a magneto optical (MO) disc, a digital versatile disc (DVD), a magnetic disk, a semiconductor memory, and so forth.

In addition, rather than the program being installed on the computer from the removable recording medium 111, the program may be downloaded through a communication network or a broadcast network and installed on the built-in hard disk 105. That is, for example, the program may be wirelessly transmitted to the computer through an artificial satellite for digital satellite broadcasting from a download site and may be transmitted in a wired manner to the computer through the network such as a local area network (LAN) or the Internet.

The computer has a built-in central processing unit (CPU) 102, and an input and output interface 110 is connected to the CPU 102 through the bus 101.

When an instruction is input through the input and output interface 101 by a user operating the input unit 107, the CPU 102 executes the program stored in the ROM 103 accordingly. Alternatively, the CPU 102 loads the program stored in the hard disk 105 onto a random access memory (RAM) 104 and executes the program.

The CPU 102 thus carries out the processes according to the flow charts described above or the processes according to the configurations of the block diagrams described above. The CPU 102, for example, then outputs the processed result, from the output unit 106 through the input and output interface 110, transmits the processed result from the communication unit 108, or stores the processed result in the hard disk 105 as necessary.

In addition, the input unit 107 includes a keyboard, a mouse, a microphone, and so forth. In addition, the output unit 106 includes a liquid crystal display (LCD), a speaker, and so forth.

In the present specification, processes executed by the computer in accordance with the program are not necessarily carried out in time-series in the order described in the flow chart. That is, the processes executed by the computer in accordance with the program include the processes carried out in parallel or individually (e.g., parallel process or process using object).

In addition, the program may be processed by one computer (processor) or may be distribution-processed by plural computers. In addition, the program may be transmitted to a remote computer and executed in the remote computer.

In addition, the embodiment of the present technology is not limited to the embodiment described above but may be variously changed within a scope not departing from the subject matter of the present technology.

That is, although for example, the human face is used as the target to be discriminated in the present embodiment, the present technology may also be applied to target discrimination for discriminating a target other than the human face.

In addition, the characteristic amount of the image is not limited to the inter-pixel difference characteristic amount.

Additionally, the present technology may also be configured as below.

(1) An information processing device including:
a correction unit configured to correct parameters of an ensemble learner using correction information for correcting the parameters of the ensemble learner having a plurality of weak learners that receive characteristic amounts extracted from an input image and output weak hypotheses indicating whether or not a predetermined target is reflected in the input image, the correction information being calculated based on a light source illuminating the target; and a discrimination unit configured to integrate the weak hypotheses output from the weak learners with respect to the characteristic amounts using the ensemble learner of which the parameters are corrected and discriminate whether or not the target is reflected in the input image based on an integrated value of the weak hypotheses.

(2) The device according to (1), further including:
a correction information calculation unit configured to calculate the correction information.

(3) The device according to (1) or (2), wherein the characteristic amounts are inter-pixel difference characteristic amounts that are differences between two pixel locations of the input image.

(4) The device according to (3), wherein, in ensemble learning for obtaining the ensemble learner, a pixel location pair that has two pixel locations used to obtain the characteristic amount, a pixel location pair having a minimum error ratio of the weak learner as a threshold value for comparison with the characteristic amount by the weak learner, and a threshold value are obtained in each of the weak learners constituting the ensemble learner as the parameters of the ensemble learner, and the correction unit corrects the threshold value.

(5) The device according to (4), further including:
a light source estimation unit configured to estimate the light source illuminating the target from the input image; and
a shaded region recognition unit configured to recognize a shaded region on which shading occurs due to the light source in the input image based on an estimated result of the light source,
wherein the correction information calculation unit obtains a correction coefficient correcting the threshold of the weak learner of which at least one pixel location of the pixel location pair used to obtain the inter-pixel difference characteristic amount is within the shaded region among the plural weak learners constituting the ensemble learner, and outputs the correction coefficient and the shaded region as the correction information.

(6) The device according to (5), wherein the correction unit corrects the threshold of the weak learner of which at least one pixel location of the pixel location pair used to obtain the inter-pixel difference characteristic amount is within the shaded region among the plural weak learners constituting the ensemble learner by virtue of the correction coefficient.

(7) The device according to (6), wherein the ensemble learning is carried out using a plurality of learning images, the learning images include positive images in which the target is reflected and negative images in which the target is not reflected, and the correction unit corrects the threshold value of the weak learner of which one pixel location is within the shaded region and the other pixel location is outside the shaded region in the pixel location pair used to obtain the inter-pixel difference characteristic amount by a multiplication value obtained by multiplying a subtraction value by a pixel value of the one pixel location, the subtraction value being obtained by subtracting the correction coefficient, which is an integer equal to or smaller than 1, from 1, in an average image of which the positive images included in the learning image are averaged.

(8) The device according to (6) or (7), wherein the correction unit corrects the threshold value of the weak learner of which the two pixel locations of the pixel location pair used to obtain the inter-pixel difference characteristic amount are within the shaded region to be multiplied by the correction coefficient, which is an integer equal to or smaller than 1.

(9) An information processing method including:
correcting parameters of an ensemble learner using correction information for correcting the parameters of the ensemble learner having a plurality of weak learners that receive characteristic amounts extracted from an input image and output weak hypotheses indicating whether or not a predetermined target is reflected in the input image, the correction information being calculated based on a light source illuminating the target; and integrating the weak hypotheses output from the weak learners with respect to the characteristic amounts using the ensemble learner of which the parameters are corrected and discriminating whether or not the target is reflected in the input image based on an integrated value of the weak hypotheses.

(10) A program for causing a computer to act as units including:

a correction unit configured to correct parameters of an ensemble learner using correction information for correcting the parameters of the ensemble learner having a plurality of weak learners that receive characteristic amounts extracted from an input image and output weak hypotheses indicating whether or not a predetermined target is reflected in the input image, the correction information being calculated based on a light source illuminating the target; and a discrimination unit configured to integrate the weak hypotheses output from the weak learners with respect to the characteristic amounts using the ensemble learner of which the parameters are corrected and discriminate whether or not the target is reflected in the input image based on an integrated value of the weak hypotheses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a light source estimation unit configured to estimate a light source illuminating a predetermined target from an input image;
a shaded region recognition unit configured to recognize a shaded region on which shading occurs due to the light source in the input image based on an estimated result of the light source;
a correction information calculation unit configured to obtain a correction coefficient correcting a threshold of the weak learner and to provide correction information;
a correction unit configured to correct parameters of an ensemble learner using the correction information for correcting the parameters of the ensemble learner having a plurality of weak learners that receive characteristic amounts extracted from the input image and output weak hypotheses indicating whether or not the predetermined target is reflected in the input image; and
a discrimination unit configured to integrate the weak hypotheses output from the weak learners with respect to the characteristic amounts using the ensemble learner of which the parameters are corrected and discriminate whether or not the target is reflected in the input image based on an integrated value of the weak hypotheses;
wherein the ensemble learning is carried out using a plurality of learning images which include positive images in which the target is reflected and negative images in which the target is not reflected, and
wherein the correction unit corrects the threshold value of the weak learner of which one pixel location is within the shaded region and the other pixel location is outside the shaded region in a pixel location pair by a multiplication value obtained by multiplying a subtraction value by a pixel value of the one pixel location, the subtraction value being obtained by subtracting the correction coefficient, which is equal to or smaller than 1, from 1, in an average image of which the positive images included in the learning image are averaged.

2. The information processing device according to claim 1, wherein the characteristic amounts are inter-pixel difference characteristic amounts that are differences between two pixel locations of the input image.

3. The information processing device according to claim 2, wherein, in ensemble learning for obtaining the ensemble learner, a pixel location pair that has two pixel locations used to obtain the characteristic amount, a pixel location pair having a minimum error ratio of the weak learner as a threshold value for comparison with the characteristic amount by the weak learner, and a threshold value are obtained in each of the weak learners constituting the ensemble learner as the parameters of the ensemble learner, and the correction unit corrects the threshold value.

4. The information processing device according to claim 3, wherein the correction information calculation unit obtains the correction coefficient correcting the threshold of the weak learner of which at least one pixel location of the pixel location pair used to obtain the inter-pixel difference characteristic amount is within the shaded region among the plural weak learners constituting the ensemble learner, and outputs the correction coefficient and the shaded region as the correction information.

5. The information processing device according to claim 4, wherein the correction unit corrects the threshold of the weak learner of which at least one pixel location of the pixel location pair used to obtain the inter-pixel difference characteristic amount is within the shaded region among the plural weak learners constituting the ensemble learner by virtue of the correction coefficient.

6. An information processing device comprising:
a correction unit configured to correct parameters of an ensemble learner using correction information for correcting the parameters of the ensemble learner having a plurality of weak learners that receive characteristic amounts extracted from an input image and output weak hypotheses indicating whether or not a predetermined target is reflected in the input image, the correction information being calculated based on a light source illuminating the target;
a discrimination unit configured to integrate the weak hypotheses output from the weak learners with respect to the characteristic amounts using the ensemble learner of which the parameters are corrected and discriminate whether or not the target is reflected in the input image based on an integrated value of the weak hypotheses,
wherein the characteristic amounts are inter-pixel difference characteristic amounts that are differences between two pixel locations of the input image,
wherein, in ensemble learning for obtaining the ensemble learner, a pixel location pair that has two pixel locations used to obtain the characteristic amount, a pixel location pair having a minimum error ratio of the weak learner as a threshold value for comparison with the characteristic amount by the weak learner, and a threshold value are obtained in each of the weak learners constituting the ensemble learner as the parameters of the ensemble learner, and the correction unit corrects the threshold value, and said information processing device further comprising:
- a light source estimation unit configured to estimate the light source illuminating the target from the input image;
- a shaded region recognition unit configured to recognize a shaded region on which shading occurs due to the light source in the input image based on an estimated result of the light source; and
- a correction information calculation unit,
- wherein the correction information calculation unit obtains a correction coefficient correcting the threshold of the weak learner of which at least one pixel location of the pixel location pair used to obtain the inter-pixel difference characteristic amount is within the shaded region among the plural weak learners constituting the ensemble learner, and outputs the correction coefficient and the shaded region as the correction information,
- wherein the correction unit corrects the threshold of the weak learner of which at least one pixel location of the pixel location pair used to obtain the inter-pixel difference characteristic amount is within the shaded region among the plural weak learners constituting the ensemble learner by virtue of the correction coefficient, and
- wherein the ensemble learning is carried out using a plurality of learning images, the learning images include positive images in which the target is reflected and negative images in which the target is not reflected, and the correction unit corrects the threshold value of the weak learner of which one pixel location is within the shaded region and the other pixel location is outside the shaded region in the pixel location pair used to obtain the inter-pixel difference characteristic amount by a multiplication value obtained by multiplying a subtraction value by a pixel value of the one pixel location, the subtraction value being obtained by subtracting the correction coefficient, which is an integer equal to or smaller than 1, from 1, in an average image of which the positive images included in the learning image are averaged.

7. The information processing device according to claim 6, wherein the correction unit corrects the threshold value of the weak learner of which the two pixel locations of the pixel location pair used to obtain the inter-pixel difference characteristic amount are within the shaded region to be multiplied by the correction coefficient, which is an integer equal to or smaller than 1.

8. An information processing method comprising:
- estimating a light source illuminating a predetermined target from an input image;
- recognizing a shaded region on which shading occurs due to the light source in the input image based on an estimated result of the light source;
- obtaining a correction coefficient correcting a threshold of the weak learner and providing correction information;
- correcting parameters of an ensemble learner using the correction information for correcting the parameters of the ensemble learner having a plurality of weak learners that receive characteristic amounts extracted from the input image and output weak hypotheses indicating whether or not the predetermined target is reflected in the input image; and
- integrating the weak hypotheses output from the weak learners with respect to the characteristic amounts using the ensemble learner of which the parameters are corrected and discriminating whether or not the target is reflected in the input image based on an integrated value of the weak hypotheses,
- wherein the ensemble learning is carried out using a plurality of learning images which include positive images in which the target is reflected and negative images in which the target is not reflected, and
- wherein the correcting corrects the threshold value of the weak learner of which one pixel location is within the shaded region and the other pixel location is outside the shaded region in a pixel location pair by a multiplication value obtained by multiplying a subtraction value by a pixel value of the one pixel location, the subtraction value being obtained by subtracting the correction coefficient, which is equal to or smaller than 1, from 1, in an average image of which the positive images included in the learning image are averaged.

9. A non-transitory computer readable medium having stored thereon a program for causing a computer to act as units comprising:
- a light source estimation unit configured to estimate a light source illuminating a predetermined target from an input image;
- a shaded region recognition unit configured to recognize a shaded region on which shading occurs due to the light source in the input image based on an estimated result of the light source;
- a correction information calculation unit configured to obtain a correction coefficient correcting a threshold of the weak learner and to provide correction information;
- a correction unit configured to correct parameters of an ensemble learner using the correction information for correcting the parameters of the ensemble learner having a plurality of weak learners that receive characteristic amounts extracted from the input image and output weak hypotheses indicating whether or not the predetermined target is reflected in the input image, the correction information being calculated based on a light source illuminating the target; and
- a discrimination unit configured to integrate the weak hypotheses output from the weak learners with respect to the characteristic amounts using the ensemble learner of which the parameters are corrected and discriminate whether or not the target is reflected in the input image based on an integrated value of the weak hypotheses,
- wherein the ensemble learning is carried out using a plurality of learning images which include positive images in which the target is reflected and negative images in which the target is not reflected, and
- wherein the correction unit corrects the threshold value of the weak learner of which one pixel location is within the shaded region and the other pixel location is outside the shaded region in a pixel location pair by a multiplication value obtained by multiplying a subtraction value by a pixel value of the one pixel location, the subtraction value being obtained by subtracting the correction coefficient, which is equal to or smaller than 1, from 1, in an average image of which the positive images included in the learning image are averaged.

* * * * *